(12) United States Patent
Bauerle et al.

(10) Patent No.: US 10,647,092 B2
(45) Date of Patent: May 12, 2020

(54) VEHICLE LUMINOUS GLAZING, VEHICLE INCORPORATING IT

(71) Applicant: SAINT-GOBAIN GLASS FRANCE, Courbevoie (FR)

(72) Inventors: Pascal Bauerle, Roye (FR); Stephan Gillessen, Alsdorf (DE); Arthur Stricher, Margny les Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/344,215

(22) PCT Filed: Oct. 24, 2017

(86) PCT No.: PCT/FR2017/052934
§ 371 (c)(1),
(2) Date: Apr. 23, 2019

(87) PCT Pub. No.: WO2018/078278
PCT Pub. Date: Mar. 5, 2018

(65) Prior Publication Data
US 2019/0255813 A1 Aug. 22, 2019

(30) Foreign Application Priority Data
Oct. 28, 2016 (FR) ..................................... 16 60533

(51) Int. Cl.
*F21V 21/00* (2006.01)
*B32B 17/10* (2006.01)
(Continued)

(52) U.S. Cl.
CPC .. *B32B 17/10541* (2013.01); *B32B 17/10036* (2013.01); *B32B 17/10761* (2013.01);
(Continued)

(58) Field of Classification Search
CPC ........ B32B 17/10541; B32B 17/10036; B32B 17/10761; B32B 2605/006; B60Q 3/54;
(Continued)

(56) References Cited

U.S. PATENT DOCUMENTS

| 8,833,989 B2 * | 9/2014 | Barton | ................... | B60Q 1/268 |
| | | | | 362/249.02 |
| 9,333,906 B2 * | 5/2016 | Barton | ................... | B60Q 1/268 |

(Continued)

FOREIGN PATENT DOCUMENTS

| DE | 10 2005 024857 B3 | 11/2006 |
| DE | 10 2013 003686 A1 | 9/2014 |

(Continued)

OTHER PUBLICATIONS

International Search Report as issued in International Patent Application No. PCT/FR2017/052934, dated Jan. 31, 2018.
(Continued)

*Primary Examiner* — Laura K Tso
(74) *Attorney, Agent, or Firm* — Pillsbury Winthrop Shaw Pittman LLP

(57) ABSTRACT

A vehicle luminous signaling glazing forming, for example, a laminated vehicle windshield includes a first exterior glazing, with first main face and second main face, a lamination interlayer made of polymeric material with an other edge face, a second interior glazing, with third main face and fourth main face, the second main face and the third main face being the internal faces of the laminated glazing. The glazing also includes a flexible carrier for the diodes including a diode zone, an emerging electrical supply zone emerging from the other edge face, divided into a plurality of track strips, carrying electrical tracks, with an individual width Wi of less than 5 cm.

21 Claims, 13 Drawing Sheets

(51) Int. Cl.
  *B60Q 3/54*    (2017.01)
  *B60Q 3/208*   (2017.01)
  *B60Q 3/80*    (2017.01)
  *B60Q 3/60*    (2017.01)
  *F21S 45/50*   (2018.01)
  *F21S 43/14*   (2018.01)
  *F21S 43/19*   (2018.01)
  *B60J 1/20*    (2006.01)
  *B60Q 1/44*    (2006.01)
  *B60K 37/04*   (2006.01)
  *B60K 35/00*   (2006.01)
  *F21Y 115/10*  (2016.01)

(52) U.S. Cl.
  CPC ............... *B60J 1/20* (2013.01); *B60K 35/00* (2013.01); *B60K 37/04* (2013.01); *B60Q 1/44* (2013.01); *B60Q 3/208* (2017.02); *B60Q 3/54* (2017.02); *B60Q 3/60* (2017.02); *B60Q 3/80* (2017.02); *F21S 43/14* (2018.01); *F21S 43/195* (2018.01); *F21S 45/50* (2018.01); *B32B 2605/006* (2013.01); *B60K 2370/1529* (2019.05); *B60K 2370/33* (2019.05); *B60K 2370/338* (2019.05); *B60K 2370/785* (2019.05); *F21Y 2115/10* (2016.08)

(58) Field of Classification Search
  CPC . B60Q 3/208; B60Q 3/80; B60Q 3/60; B60Q 1/44; F21S 45/50; F21S 43/14; F21S 43/195; B60J 1/20
  USPC .................................................. 362/549, 503
  See application file for complete search history.

(56) References Cited

U.S. PATENT DOCUMENTS

| | | | |
|---|---|---|---|
| 2005/0238857 A1* | 10/2005 | Day | B32B 17/10045 428/209 |
| 2015/0146286 A1 | 5/2015 | Hagen et al. | |
| 2017/0327031 A1* | 11/2017 | Bauerle | B32B 17/10036 |
| 2018/0207909 A1* | 7/2018 | Vivier | G06F 3/044 |
| 2019/0016095 A1* | 1/2019 | Labrot | B32B 17/10174 |
| 2019/0134954 A1* | 5/2019 | Bauerle | B60K 37/06 |
| 2019/0143648 A1* | 5/2019 | Bauerle | B60J 1/004 362/612 |
| 2019/0193376 A1* | 6/2019 | Bauerle | B32B 17/10036 |

FOREIGN PATENT DOCUMENTS

| | | |
|---|---|---|
| EP | 0 844 075 A1 | 5/1998 |
| WO | WO 2004/025334 A2 | 3/2004 |
| WO | WO 2010/136702 A1 | 12/2010 |
| WO | WO 2016/079459 A1 | 5/2016 |

OTHER PUBLICATIONS

International Preliminary Report on Patentability and the Written Opinion of the International Searching Authority as issued in International Patent Application No. PCT/FR2017/052934, dated Apr. 30, 2019.

* cited by examiner

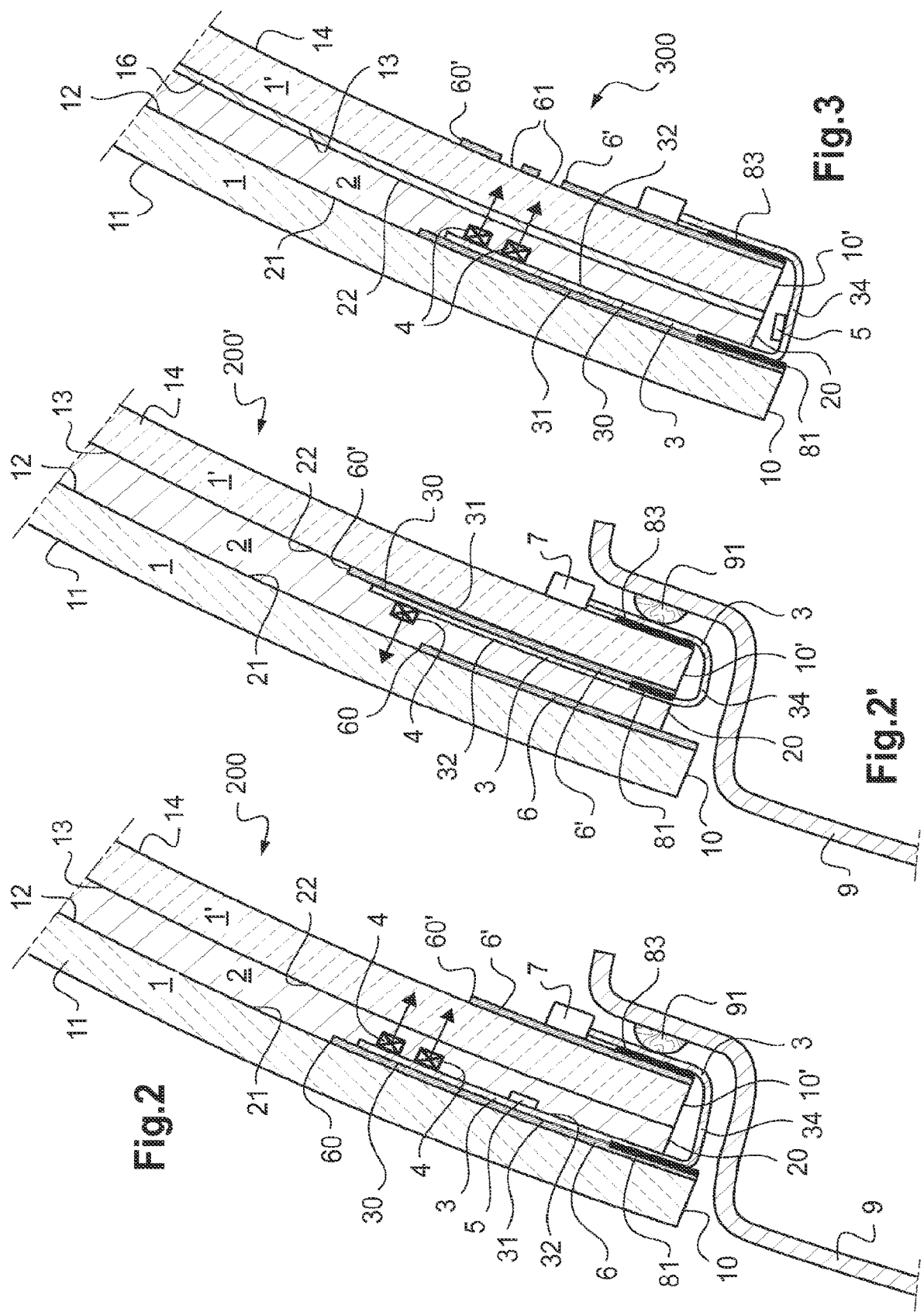

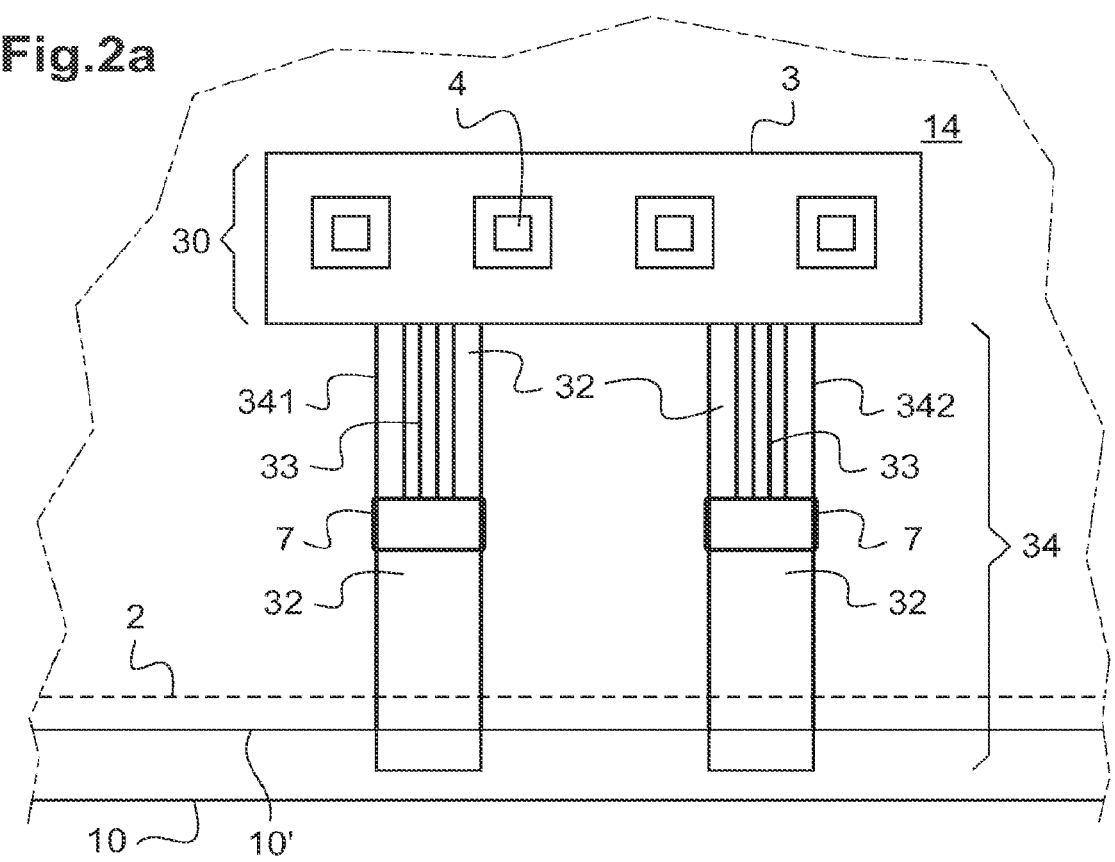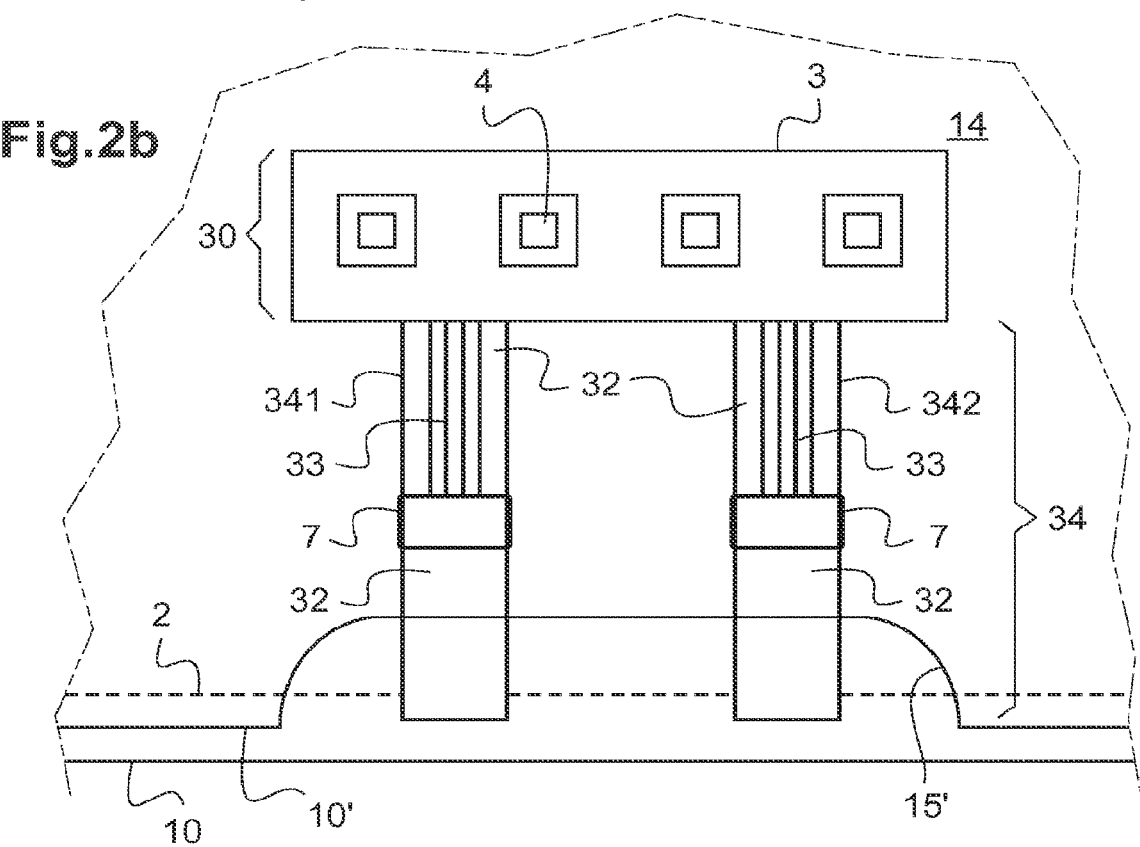

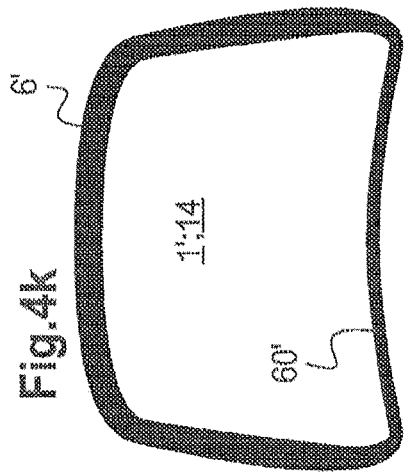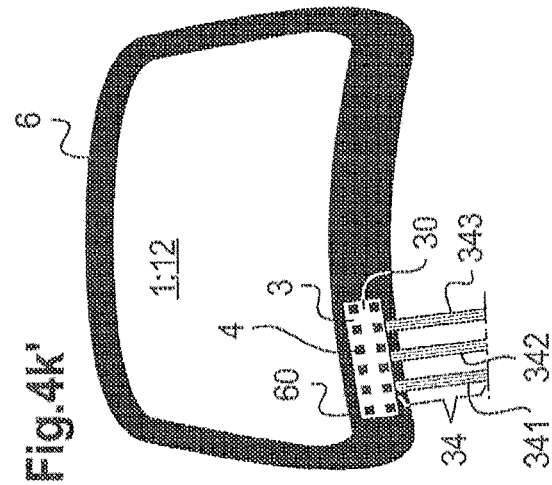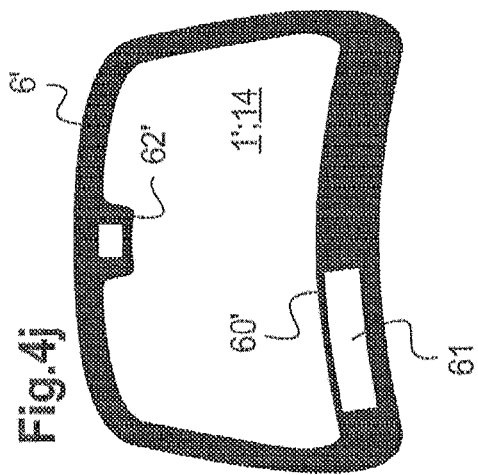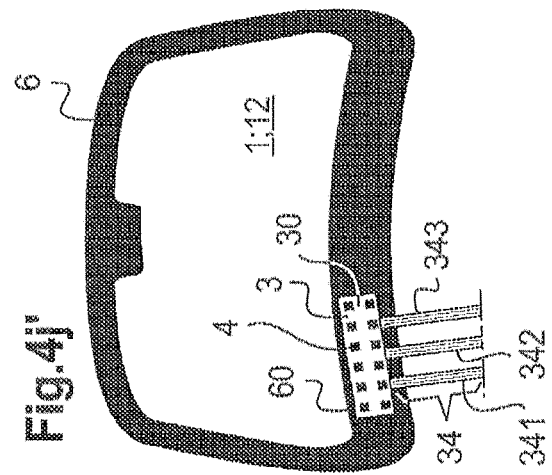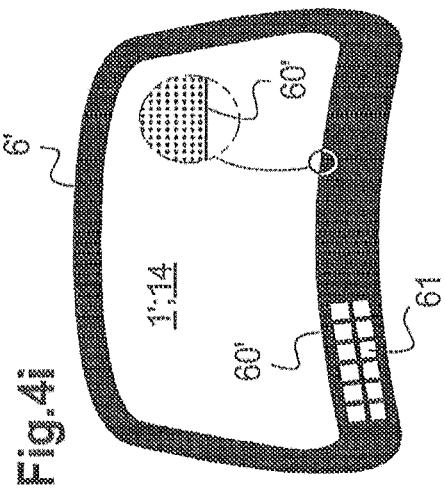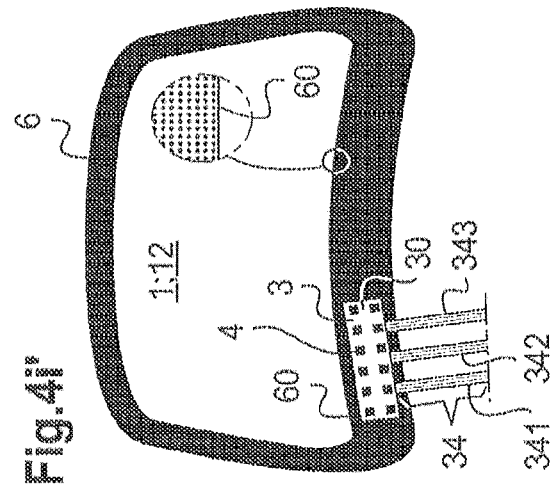

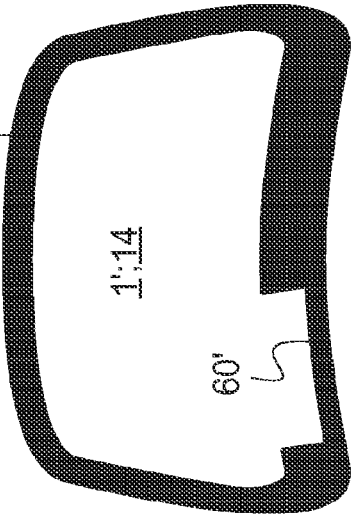
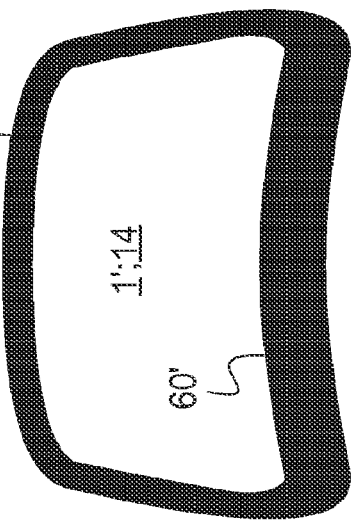
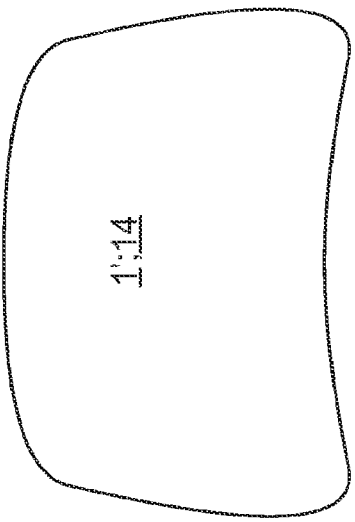
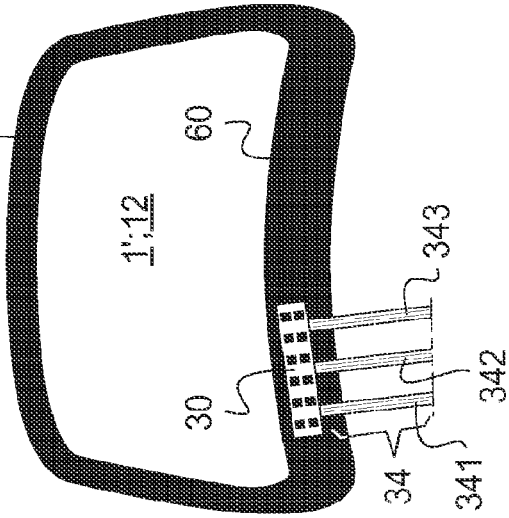
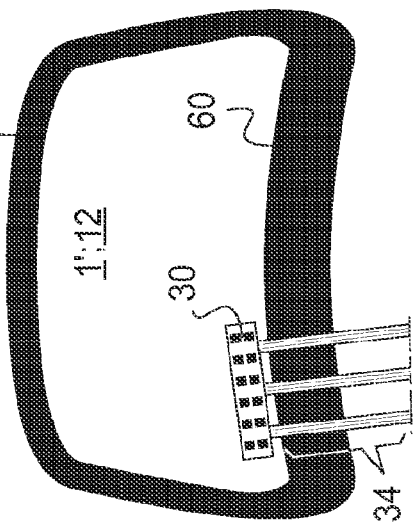
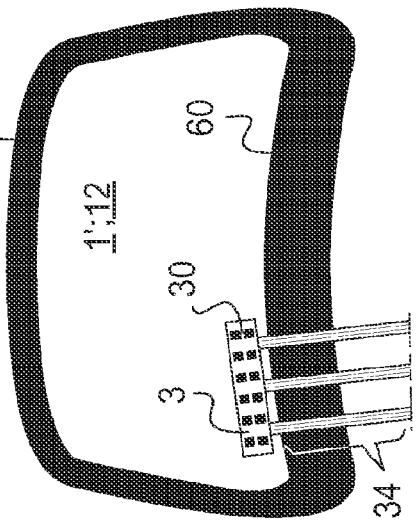

VEHICLE LUMINOUS GLAZING, VEHICLE INCORPORATING IT

CROSS-REFERENCE TO RELATED APPLICATIONS

This application is the U.S. National Stage of PCT/FR2017/052934 filed on Oct. 24, 2017, which in turn claims priority to French patent application number 1660533 filed Oct. 28, 2016. The content of these applications are incorporated herein by reference in their entireties.

The invention relates to a vehicle luminous glazing and to a vehicle comprising such a glazing.

The incorporation of decorative, functional and signaling lighting in vehicle glazings is increasingly desired.

Patent application WO2016/079459 provides, in an embodiment in connection with its FIG. 4, a bent laminated windshield with a row of inorganic light-emitting diodes (LEDs) on an L-shaped printed circuit board (PCB), that is to say a circuit board with a rectangular part which is the diode zone and an extension which is a narrow part with electrical tracks exiting from the edge face of the windshield.

However, assembling defects are observed.

A subject matter of the patent application is thus a bent vehicle luminous laminated glazing having LEDs which is more reliable, reducing the reject rate.

To this end, a first subject matter of the present patent application is a vehicle luminous glazing which is internally lit, in particular a windshield (front glazing) or side window or else roof, comprising:

a bent laminated glazing comprising:
  a first glazing (bent), which is a glass sheet (preferably having corners, in particular quadrilateral, rectangular) forming an exterior glazing—made of optionally clear, extra-clear or even tinted, in particular gray or green, mineral glass—with first and second main faces respectively "face F1" and "face F2", and a first edge face, which first glazing is in particular of thickness E1 which is preferably for an automobile glazing at most 2.5 mm, even at most 2.2 mm—in particular of 1.9 mm, 1.8 mm, 1.6 mm or else 1.4 mm—or even at most 1.3 mm or at most 1 mm
  a second glazing (bent), which is a glass sheet (preferably having corners, in particular quadrilateral, rectangular) forming an interior glazing—made of preferably clear or extra-clear, indeed even tinted, mineral glass—with third and fourth main faces respectively face F3 and face F4, and a second edge face by the first edge face optionally set back from the first edge face in particular by at most 2 mm or even by at most 1 mm, which second glazing is in particular of thickness T'1 which for an automobile glazing is preferably less than that of the first glazing, even at most 2.2 mm—in particular 1.9 mm, 1.8 mm, 1.6 mm and 1.4 mm—or even at most 1.3 mm or at most 1 mm, the total thickness of the first and second glazings preferably being strictly less than 4 mm, even than 3.7 mm (for a motor vehicle glazing)
  between the face F2 and the face F3, which are the internal faces of the laminated glazing, an optionally clear, extra-clear, indeed even tinted, in particular gray or green, lamination interlayer made of thermoplastic polymeric material and better still made of polyvinyl butyral (PVB), in particular of thickness E2 which is preferably for an automobile glazing at most 1.8 mm, better still at most 1.2 mm and even at most 0.9 mm (and better still at least 0.3 mm and even at least 0.5 mm), in particular set back from the edge face of the first glazing for example by at most 2 mm or by at most 1 mm and/or set back from the edge face of the second glazing for example by at most 4 mm or by at most 3 mm, this lamination interlayer having a main face F'2 in adhesive contact with the face F2 (tin face or other face, if float glass)—bare or with a coating—and a main face F'3 in adhesive contact with the face F3 (tin face or other, if float glass)—bare or with a coating—
  between the faces F2 and F3, inorganic light-emitting diodes, each diode having a light-emitting face facing the face F3 capable of emitting light (monochromatic or polychromatic) in the direction of the face F3, each diode preferably being of thickness E4, preferably submillimetric and better still of at least 0.2 mm
  a carrier for the diodes having a main face, "front face", facing the face F3 and a main face, "rear face", facing the face F2, the diodes being mounted on the front face, the carrier for the diodes being flexible, in particular polymeric, of submillimetric thickness E3 and better still of at most 0.2 mm and even of at most 0.1 mm, the carrier for the diodes comprising, on the front face, electrically conductive zones for supplying electricity, "electrical tracks", a portion or all of the electrical tracks supplying the diodes.

The carrier for the diodes comprises:
between the faces F2 and F3, a "diode" zone (defining the internal luminous zone seen from the face F4 side) comprising said diodes, along the first edge face, with a length L0 along the first edge face (L0 for example taken parallel to the first edge face) of at least 6 cm and even of at least 10 cm and even of at least 15 cm,—as a strip or as another form (geometric: ring, triangle, and the like, forming a symbol or a pictogram, and the like)—and in particular with a width W0 (normal to L0) of less than or equal to L0, preferably of at most 5 cm and even of at most 4 cm,
an emerging electrical supply zone, prolonging the diode zone, extending in the direction of the first edge face and emerging from the other edge face, comprising a supply zone, "internal zone", between the faces F2 and F3, defined by a width Wt which is less than L0 (Wt for example taken parallel to the first edge face and/or to L0), which internal zone is prolonged by a supply zone beyond the other edge face, "protruding zone".

The lamination interlayer is present between the front face and the face F3 and is optionally between the diodes and the face F3.

The bent laminated glazing according to the invention additionally comprises an adhesive leaktight to liquid water—indeed even at the time of an injection in order to carry out a polymeric encapsulation, leaktight to a liquid polymeric composition, such as polyurethane-, preferably in the form of a strip, positioned between the face F2 and the rear face in a portion of the rear face (leaving a surface area of the rear face against the face F2), of submillimetric thickness E8, preferably of at most 0.2 mm, better still of at most 0.1 mm and better still of at most 0.05 mm, in particular E3+E8 is preferably of at most 0.15 mm, preferably a double-sided adhesive tape (rather than an adhesive).

According to the invention, the total width Wt is at least 5 cm, the emerging zone is divided into a plurality of "track" strips carrying electrical tracks (preferably all or at least most of them carry electrical tracks for the diodes and/or for other components on the front face) with an individual width Wi of less than 5 cm in the internal zone and preferably of at least 5 mm and even of at least 1 cm, emerging strips of the other edge face (in the protruding zone).

And, according to the invention, the lamination interlayer is present in the "interstrip" space between neighboring track strips, in particular with a width $W_S$ of at least 5 mm and better still of at least 1 cm and better still of at most 20 cm and even of at most 10 cm.

Similarly, a second subject matter of the present patent application is a vehicle glazing having external luminous signaling, in particular a side window or rear window, indeed even windshield (front glazing), comprising:

a bent laminated glazing comprising:
  a first glazing (bent), which is a glass sheet (preferably having corners, in particular quadrilateral, rectangular) forming an exterior glazing—made of optionally clear, extra-clear or tinted, in particular gray or green, mineral glass—with first and second main faces respectively "face F1" and "face F2", and a first edge face, which glazing is in particular of thickness E1 which is preferably for an automobile glazing at most 2.5 mm, even at most 2.2 mm—in particular of 1.9 mm, 1.8 mm, 1.6 mm or else 1.4 mm—or even at most 1.3 mm or at most 1 mm
  a second glazing (bent), which is a glass sheet (preferably having corners, in particular quadrilateral, rectangular) forming an interior glazing—made of preferably clear or extra-clear, indeed even tinted, mineral glass—with third and fourth main faces respectively face F3 and face F4, and a second edge face by the first edge face optionally set back from the first edge face in particular by at most 2 mm or even by at most 1 mm, which glazing is in particular of thickness T'1 which for an automobile glazing is preferably less than that of the first glazing, even at most 2.2 mm—in particular 1.9 mm, 1.8 mm, 1.6 mm and 1.4 mm—or even at most 1.3 mm or at most 1 mm, the total thickness of the first and second glazings preferably being strictly less than 4 mm, even than 3.7 mm (for a motor vehicle glazing)
  between the face F2 and the face F3, which are the internal faces of the laminated glazing, an optionally clear, extra-clear, indeed even tinted, in particular gray or green, lamination interlayer made of thermoplastic polymeric material and better still made of polyvinyl butyral (PVB), in particular of thickness E2 which is preferably for an automobile glazing of at most 1.8 mm, better still of at most 1.2 mm and even of at most 0.9 mm (and better still of at least 0.3 mm and even of at least 0.5 mm), in particular set back from the edge face of the first glazing for example by at most 2 mm or by at most 1 mm and/or set back from the edge face of the second glazing for example by at most 4 mm or by at most 3 mm, this lamination interlayer having a main face F'2 in adhesive contact with the face F2 (tin face or other face, if float glass)—bare or with a coating—and a main face F'3 in adhesive contact with the face F3 (tin face or other face, if float glass)—bare or with a coating—
  between the faces F2 and F3, inorganic light-emitting diodes, each diode having a light-emitting face facing the face F2 capable of emitting light (monochromatic or polychromatic) in the direction of the face F2, each diode preferably being of thickness E4, preferably submillimetric and better still of at least 0.2 mm
  a carrier for the diodes having a main face, "front" face, facing the face F2 and a main face, "rear" face, facing the face F3, the diodes being mounted on the front face, the carrier for the diodes being flexible, in particular polymeric, of submillimetric thickness E3 and better still of at most 0.2 mm and even of at most 0.1 mm, the carrier for the diodes comprising, on the front face, electrically conductive zones for supplying electricity, "electrical tracks", a portion or all of the electrical tracks supplying the diodes.

The carrier for the diodes comprises:
  between the faces F2 and F3, a "diode" zone (defining the luminous zone seen from the face F1 side) comprising said diodes, along the second edge face, with a length L0 along the second edge face (for example taken parallel to the second edge face) of at least 6 cm and even of at least 10 cm and even of at least 15 cm, as a strip or as any other form (geometric: ring, triangle, and the like, forming a symbol or a pictogram, and the like), and in particular with a width W0 (normal to L0) of less than or equal to L0, preferably of at most 5 cm and even of at most 4 cm
  an emerging supply zone, prolonging the diode zone and extending in the direction of the second edge face and emerging from the other edge face, comprising a supply zone, "internal zone", between the faces F2 and F3, defined by a width Wt which is less than L0 (for example taken parallel to the second edge face and/or to L0), which internal zone is prolonged by a supply zone beyond the other edge face, "protruding zone".

The lamination interlayer is present between the front face and the face F2 and is optionally between the diodes and the face F2.

The luminous glazing additionally comprises an adhesive leaktight to liquid water—indeed even at the time of an injection in order to carry out a polymeric encapsulation, leaktight to a liquid polymeric composition, such as polyurethane-, preferably in the form of a strip, positioned between the rear face and the face F3 in a portion of the rear face (leaving a surface area of the rear face against the face F3), of submillimetric thickness E8, preferably of at most 0.2 mm, better still of at most 0.1 mm and better still of at most 0.05 mm—in particular E3+E8 is preferably of at most 0.15 mm, better still of at most 0.1 mm.

According to the invention, finally, the total width Wt is at least 5 cm, the emerging zone is divided into a plurality of "track" strips carrying electrical tracks (preferably all or at least most of them carry electrical tracks for the diodes and/or for other components on the front face) with an individual width Wi of less than 5 cm in the internal zone and preferably of at least 5 mm, better still of at least 1 cm, emerging track strips of the other edge face (in the protruding zone).

And, according to the invention, the lamination interlayer is present in the "interstrip" space between neighboring track strips, in particular with a width $W_S$ of at least 5 mm and better still of at least 1 cm and even of at most 20 cm and even of at most 10 cm.

When there are only a few diodes and other electrical components and/or when the diodes incorporated are monochromatic, the internal zone consequently comprises only a few tracks and can be relatively narrow, typically of 2 cm, as described in the prior art.

However, on considering the incorporation of a large number of diodes and/or of polychromatic diodes and even of other electrical components (of submillimetric thickness E7 if in the diode zone or the internal zone), such as electrical microcontrollers, or of other resistive or capacitive elements, the number of tracks thus increases and naturally results in a greater width, above 5 cm.

If it is chosen to widen the internal part beyond 5 cm, the applicant company has found that problems occur:

in order to follow the curvature of the bent glazing, the radius of curvature of the windshield is, for example, between 2 and 12 m, the carrier for the diodes, which is a flat sheet at the start, forms creases and thus displays defects in appearance the increase in the width of the surface area between the rear face and the face F2 (respectively F3 for the second subject matter) which is devoid of adhesive results in the mechanical weakening of the bent laminated glazing over the whole of its surface area, and thus in a local fragility the increase in the width of the surface area between the rear face and the face F2 (respectively F3 for the second subject matter) which is devoid of adhesive can generate air bubbles which, with aging, can rise up in the lamination interlayer and cause defects in appearance the increase in the width of the surface area between the rear face and the face F2 (respectively F3 for the second subject matter) which is devoid of adhesive can make possible the infiltration of water, thus damaging the diodes and/or any electrical component present in the glazing.

In order to overcome these problems, the present invention thus provides for the division of the internal part of the diode carrier (such as PCB) into several narrow zones (strips), introducing a greater freedom of conformation to the diode carrier (PCB), which is then more in a position to follow the curvature of the bent laminated glazing.

The diode carrier (PCB type) according to the invention contains electrical tracks which make it possible to supply a large number of diodes, indeed even other electrical components, in the internal zone and even outside the lamination.

The internal zone preferably remains a zone of shrinkage of the diode carrier. The diode zone and the internal zone (and even the diode zone and all of the emerging zone) can have a general U shape (two track strips) or comb shape (more than two track strips). The internal zone as a plurality of track strips can extend over the entire length L0 with strips at regular or irregular intervals or else prolong a portion of the diode zone, for example a central portion (giving a diode carrier of general T shape).

It may be desired to limit as much as possible the number of strips for easier handling, the speed of assembling and even to space them out as little as possible and for unobtrusiveness or to facilitate the connection to the electrical supply source.

Advantageously, the "interstrip" space between two neighboring track strips has a width $W_S$ of at least 5 mm and even of at most 20 cm. $W_S$ can be unvarying. $W_S$ can be identical for all the interstrip spaces along the first edge face (respectively second edge face for the second subject matter).

For the first subject matter, the diode carrier can have an extension in the direction of an adjacent edge face of the first edge face. There can thus be a second diode zone along the adjacent edge face with second track strips, such as those already described.

For the second subject matter, the diode carrier can have an extension in the direction of an adjacent edge face of the second edge face. There can thus be a second diode zone along the adjacent edge face with second track strips, such as those already described.

The lamination interlayer, for its part, can be formed from one or more films, for example having a thickness between 0.2 mm and 1.1 mm.

The lamination interlayer can be chosen from polyvinyl butyral (PVB), ethylene/vinyl acetate (EVA), polyurethane (PU) or ionomer resin, alone or as mixtures of several varieties of one of them and/or of several of them; the term "varieties" in this instance refers to variations in the content of plasticizer, of branchings/linearity, average molecular weight of the molecules.

It may be preferred to use a single sheet (of PVB) for the interlayer for economic reasons (cost of material and simply a series of local cut-outs to perform).

In particular, in an embodiment, the lamination interlayer is formed from a single sheet (clear, extra-clear, indeed even tinted). The use of a single sheet (of PVB) of preferably standard thickness of 0.6 mm to 0.9 mm (for greater safety rather than 0.38 mm approximately) is made possible by the choice of new ultrathin submillimetric power diodes which have only very recently become available on the market.

The PVB interlayer is optionally acoustic and/or tinted or preassembled first PVB sheet/functional transparent plastic film, such as a polyethylene terephthalate film referred to as functional PET (preferably with a functional layer, for example an electrically conductive layer)/second PVB sheet; the optional second sheet is clear or extra-clear.

The transparent plastic film can have a thickness of between 10 and 100 μm. The transparent plastic film can be made of polyamide, polyester, polyolefin (PE: polyethylene, PP: polypropylene), polystyrene, polyvinyl chloride (PVC), polyethylene terephthalate (PET), polymethyl methacrylate (PMMA) or polycarbonate (PC). A clear film is preferred, in particular PET.

Use may be made, as this, of, for example, a clear coated PET film, for example XIR from Eastman, a coextruded PET/PMMA film, for example of the SRF 3M® type, but also numerous other films (for example made of PC, PE, PEN, PMMA, PVC), which are visually as transparent as possible and which are not modified, in the autoclave, as regards their surface and their consistency.

The acoustic PVB interlayer can comprise at least one "central" layer made of viscoelastic plastic with vibro-acoustic damping properties, in particular based on polyvinyl butyral (PVB) and plasticizer, and furthermore comprising two external layers made of standard PVB, the central layer being between the two external layers.

Optionally, one or both external layers has a cross section which decreases in wedge shape from the top toward the bottom of the laminated glazing, the layer made of viscoelastic plastic with vibro-acoustic damping properties having an unvarying cross section from the top toward the bottom of the laminated glazing. Mention may be made, as an example of an acoustic sheet, of the patent EP 0 844 075.

The PVB interlayer can be wedge-shaped, thus with a cross section which decreases in wedge shape from the top toward the bottom of the laminated glazing in order to avoid a double image in the case of a head-up display (HUD), very particularly for a windshield.

Before the lamination, the lamination interlayer, preferably made of PVB, can have blind or through holes housing the diodes. In the bent laminated glazing, the lamination interlayer can still have the through holes (of identical or reduced width) can or else, with creep, the lamination interlayer can fill the space between the diodes and the face concerned (F3 for the first subject matter or F2 for the second subject matter). Before the lamination, the blind or through opening preferably has a width (and length) of at most 20 mm and even of at most 15 mm and even of at most 10 mm or 5 mm, this being as a function of the width of the diodes, which are gradually miniaturized.

The blind or through openings can be in an optionally acoustic PVB and/or be in wedge shape, in particular in wedge shape for a windshield, are also in a PVB/plastic film/PVB composite element.

In the bent laminated glazing, a blind or through opening preferably has a width (and length) of at most 20 mm and even of at most 15 mm and even of at most 10 mm or 5 mm, this being as a function of the width of the diodes, which are gradually miniaturized.

For example, it is possible to use a PVB of the variety having a relatively high creep or a PVB of acoustic variety, in particular with a thickness of approximately 0.8 mm, sold by Eastman under the registered trademark Saflex®, or even with a thickness of approximately 0.5 mm, sold by Sekisui under the registered trademark S-LEC®.

The lamination interlayer (in particular with blind or through holes) can be thicker to the least possible extent (with respect to the diodes) in order not to risk generating too many air bubbles.

For the vehicle glazing having an internal luminous zone, the distance H between the emitting face of the diodes and the face F3 is preferably nonzero (in order to avoid damaging the diodes) and preferably of at most 0.5 mm and even ranging from 0.1 to 0.3 mm. And the lamination interlayer is optionally between the diodes (the emitting faces) and the face F3 over a preferably nonzero thickness Tr of at most 0.5 mm and even ranging from 0.1 to 0.3 mm.

Similarly, for the vehicle glazing having external luminous signaling, the distance H between the emitting face of the diodes and the face F2 is preferably nonzero and preferably at most 0.5 mm and even ranging from 0.1 to 0.3 mm and the lamination interlayer is optionally between the diodes (the emitting faces) and the face F2 over a preferably nonzero thickness Tr of at most 0.5 mm and even ranging from 0.1 to 0.3 mm.

Preferably, in particular a motor vehicle windshield:
the lamination interlayer is made of poly(vinyl butyral) (PVB) with a thickness E2 of at most 0.9 mm,
the diodes have a thickness E4 which is less than E2, preferably of at most 0.8 mm and even of at most 0.5 mm
the carrier for the diodes has a thickness E3 of at most 0.1 mm and even of at most 0.05 mm
and even the first and second glazings have thicknesses E1 and E2 of at most 2.1 mm.

As regards the track strips, the width Wi can be identical or adapted as a function of the distribution of the diodes and/or other (opto)electronic component(s) in the diode zone and/or even in the internal connection zone.

For simplicity, one at least of the following characteristics can be provided:
the track strips can be in the protruding zone with the same width as the width Wi,
the track strips are in the protruding zone with a length of at least 5 cm and better still of at least 10 cm or 20 cm,
the track strips are in the protruding zone, and are connected (at least in pairs) over a width D of at least 0.5 cm and even of at least 1 cm (for an aid in the assembling, in the positioning) and better still of at most 5 cm, and then preferably redeployed as (as many) strips in the direction of the terminal part (connected to a connector), in particular as many strips as in the internal zone,
the track strips are rectangular in shape,
the track strips are rectilinear, at least in the internal zone—the edge face of the diode zone defines rectilinear or arc-shaped "linking" zones between neighboring tracks strips (side of first edge face or respectively second edge face), or else comprises a beveled edge or a groove—on the consecutive sharp edges-, this being done in order to limit the risks of tears,
the track strips are parallel with one another to ±5° and/or are normal to the first edge face (respectively to the second edge face for the second subject matter) to ±5°
in one or all of the track strips, the distance between the edge face of the carrier for the diodes and the closest electrical track is less than 1 cm and even than 0.5 cm.

For the first subject matter, the adhesive leaktight to liquid water, preferably double-sided adhesive tape, can have a length L8 (parallel to L0, to the first edge face) at least equal to Wt and even protruding on either side of the track strips, in particular by at least 1 mm and even by at most 5 mm. The width W8 (normal to the first edge face) is preferably of at least 1 mm.

For the first subject matter, the rear face and the face F2 are spaced out (are not in direct contact) in the zone ranging from the first edge face and up to the outermost edge face of said adhesive; in particular, the adhesive protrudes from the adhesive rear face in the direction of the first edge face. Preferably, the adhesive leaktight to liquid water, preferably double-sided adhesive tape, is present on the face F2 beyond the other edge face.

For the second subject matter, the adhesive leaktight to liquid water, preferably double-sided adhesive tape, can have a length L8 (parallel to L0, to the second edge face) at least equal to Wt and even protruding on either side of the track strips, in particular by at least 1 mm and even by at most 5 mm. The width W8 (normal to the second edge face) is of at least 1 mm.

For the second subject matter, the rear face and the face F3 are preferably spaced out (are not in direct contact) in the zone ranging from the second edge face and up to the outermost edge face of said leaktightness adhesive, preferably double-sided adhesive tape; in particular, the leaktightness adhesive protrudes from the adhesive rear face in the direction of the second edge face. Preferably, the adhesive leaktight to liquid water, preferably double-sided adhesive tape, is present on the face F3 beyond the other edge face.

For simplicity, said adhesive leaktight to liquid water can be a single double-sided adhesive tape which extends over at least the width Wt, that is to say over the track strips and between the track strips (and even protruding from the two outermost sides).

Preferably, in order to better guarantee leaktightness, said adhesive leaktight to liquid water can be an assembly of individual double-sided adhesive tapes, spaced out from one another, each track strip having an individual adhesive tape.

In addition, it is desired to properly position the diode zone. Consequently, preferably, the front face comprises one or more double-sided adhesive tapes, "alignment tapes", offset from the (emitting faces) of the diodes and even preferably offset from said adhesive leaktight to liquid water, with a submillimetric thickness T'8 which is better still of at most 0.2 mm and even of at most 0.1 mm or of at most 0.05 mm, and better still with E3+T'8 preferably of at most 0.15 mm, better still of at most 0.1 mm, in contact with the lamination interlayer—in contact with the face F'2 of the lamination interlayer for the glazing having an internal luminous zone or with the face F'3 of the lamination interlayer for the glazing having external signaling-.

In particular, the alignment tape or tapes (for example transparent if not masked) are in the diode zone, for example two tapes on either side of the row or rows of diodes or of the diode pattern (in particular if the diode zone of rectangular shape close to the two side ends).

In particular, the alignment tape or tapes are on one or more or all of the track strips, preferably close to the diode zone, for better handling, for example at less than 1 cm from the diode zone.

For example, use is made of one or more double-sided adhesive tapes, identical in nature and in thickness and even in width to the double-sided adhesive tape forming said adhesive leaktight to liquid water.

Preferably, the adhesive leaktight to liquid water and the alignment tape or tapes survive at a temperature of at least 100° C. and even of at least 150° C., in particular withstand the lamination cycle.

For example, a (each) double-sided adhesive tape according to the invention (external tape, leaktightness tape, alignment tape) comprises a polymeric (polyester, for example PET) or metal substrate with adhesive-treated (for example acrylic) main faces. A (each) double-sided adhesive tape according to the invention can be opaque, especially if it is masked.

If necessary, for example if not masked, the (each) double-sided adhesive tape visible according to the invention is transparent.

There may be a single protruding zone (tape) or an assembly of protruding zones (tapes) in the prolongation of the internal zone.

Furthermore, alternatively or cumulatively, in the protruding zone (single or as several tapes, in particular as many tapes as in the internal zone), the carrier for the diodes can be curved with a "terminal" part in a zone at the periphery of the face F4, adhesively bonded with a double-sided adhesive tape, "external tape", (as one or more tapes) on the front face of the carrier for the diodes for the glazing having an internal luminous zone (first subject matter) or on the rear face of the carrier for the diodes for the glazing having external signaling (second subject matter)

The external tape can be a single external tape or forms an assembly of individual external double-sided adhesive tapes, in particular as many external tapes as track strips, for example external tapes spaced out by a space with a width equal to the width $W_S$.

Preferably, for the glazing having an internal luminous zone, the zone of the rear face for the adhesive bonding of a metal frame—which can be dismantled or forming part of the body of the vehicle—is at least partly facing the zone of the external tape on the front face. The width of the adhesive bonding (string of adhesive) of the metal frame is, for example, at most 20 mm, in particular of 5 to 15 mm.

Preferably, for the glazing having external signaling, the zone of the front face for the adhesive bonding of a metal frame—which can be dismantled or forming part of the body of the vehicle—is at least partly facing the zone of the external tape on the front face. The width of the adhesive bonding (string of adhesive) of the metal frame is, for example, at most 20 mm, in particular of 5 to 15 mm.

The metal frame is not necessarily a closed loop around the bent laminated glazing, for example is a strip (rectilinear), an L shape or a U shape.

The terminal part of the diode carrier can be connected (by clip-fastening, welding, overmolding, and the like) to an electrical connector which itself can be connected to an electrical cable system leading to a unit for controlling the diodes, itself preferably connected to the battery of the vehicle.

The electrical connector can be against, adhesively bonded to or spaced out from the face F4.

The distance between the terminal part and the second edge face of the second glazing is sufficiently great for this terminal part to be accessible during the assembling or disassembling. The total length (opened out) is adjusted for the protruding zone be curved and fixed on face F4; the protruding zone preferably has a length of 20 to 150 cm.

The second glazing can preferably comprise a local notch. The protruding zone of the carrier for the diodes exits from the second edge face via the notch. The depth of the notch can be greater than or equal to the thickness of the protruding zone in order to avoid excess thickness or to prevent it from being visible from the outside in the case of an obvious edge. In practice, the depth of the notch is preferably at most 3 mm or even at most 1 mm and better still at least the thickness E3. The notch zone displays the lamination interlayer or is (substantially) devoid of lamination interlayer (having a cutout, and the like).

The electrical tracks and the "intertrack" space between the neighboring tracks can be covered with an electrically insulating material, such as a layer of resin or varnish (deposited by the liquid route, and the like) or a transparent or nontransparent protective film (PET, polyimide, and the like), for example treated with adhesive. This material can be used for masking the electrical tracks, in particular in the diode zone (it being possible for the internal zone to be otherwise masked, for example with an enamel) and even in the internal zone, indeed even in the protruding zone. For example, an opaque (black, and the like) layer, such as a varnish, is chosen. This layer can be an inorganic or organic layer, in particular of tinted polymer, for example made of polyethylene or of polymethyl methacrylate.

In a first configuration, the diode zone can comprise several rows of diodes (for example at least 5 or 8 diodes per row), each in electrical contact with at least two electrical tracks, each of the diodes with a width W4 of at most 5 mm and spaced out by at most 1 cm, preferably at most 5 rows. For example, two or three rows of diodes (for example of 8 diodes per row) with a width of 4 mm and spaced out by 1 cm are chosen. If it is desired to limit the width of the diode zone, it can be limited to a maximum of three rows.

The diode zone can extend over a fraction of the length of the first edge face and over the entire length, in particular without emerging from the bent laminated glazing. The width (W0) of the diode zone can preferably be at most 10 cm and even 6 cm.

In a second configuration, the diode zone can comprise a plurality of diodes emitting a polychromatic light (for example at least 5 or 8 diodes), in particular in one or more rows, each in electrical contact with at least four electrical tracks, each of the diodes with a width W4 of at most 5 mm and even of at most 1 mm, indeed even of at most 0.5 mm, and spaced out by at most 2 cm. For example, a row of 8 diodes with a width of 4 mm and spaced out by 1 cm is chosen.

In one configuration, the diodes can form a luminous pattern, for example a luminous geometric pattern, in particular a pictogram.

For a motor vehicle windshield, this can be an arrow, a series of arrows (which light up independently, for example in order to form an indicator), a warning triangle or any other symbol with regard to the state of the car or with regard to exterior information (accident, anticollision light alarm, state of the traffic, of the communications network, itinerary to be followed).

For a roof or a side window, this can, for example, be a luminous circle or ring.

For a motor vehicle window, this can be an arrow, a series of arrows (which light up independently, for example in order to form a turn signal indicator), a warning triangle or any other symbol with regard to the state of the car or with regard to exterior information (accident, anticollision light alarm).

Between the face F2 or F3, in the diode zone and/or in the internal zone, the carrier for the diodes can comprise, on the front face, another or other electronic components with a thickness E5 which is submillimetric and better still of at most 0.8 mm (and/or less than or equal to the thickness E4 of the diodes) chosen from one at least of the following elements: a resistive element, a capacitive element, a transistor, a microcontroller (for regulating the supply current of the diodes, in order to protect them and even to regulate the brightness thereof) or even an optoelectronic component.

Of course, the carrier for the diodes can alternatively or cumulatively comprise the front face in the protruding zone another or other electronic components with a submillimetric or nonsubmillimetric thickness E5 chosen from one at least of the following elements: a resistive element, a capacitive element, a transistor, a microcontroller or an optoelectronic component.

A diode according to the invention can preferably be a surface mount device (SMD) often comprising a peripheral packaging.

In a preferred embodiment, each diode, preferably power diode, being a component including a semiconductor chip and is equipped with a polymeric or ceramic peripheral packaging encapsulating the edge face of the component (and defining the edge face of the diode) and jutting out over the front face of the component, surrounding the semiconductor chip.

The diode can comprise a protective resin or a material having a color conversion function, even just on the semiconductor chip. The semiconductor chip can be embedded in a material (resin, and the like).

The diode can be devoid of optical element (above the semiconductor chip (which is or is not embedded in the material) in order to facilitate compactness.

The packaging can correspond to the maximum thickness (height) E4 of the diode. The packaging is, for example, made of epoxy. A polymeric packaging can optionally shrink (the final thickness after lamination can be less than the initial thickness) during the lamination. The (polymeric) packaging can be opaque.

The packaging (which is monolithic or made of two segments) can comprise a part forming a seating carrying the semiconductor chip and a part forming a reflector which widens with distance from the seating (higher than the chip).

Preferably, the diodes have a Lambertian or quasi-Lambertian emission.

Reference may be made to the work entitled "Les leds pour l'éclairage" [LEDs for Lighting], by Laurent Massol, published by Dunod, for the different types of diodes.

The diodes are top emitting rather than side emitting.

The width W4 (and even length L4) of a diode with a single semiconductor chip, generally a square-shaped diode, is preferably at most 5 mm and even at most 1 mm. The length of a (polychromatic light) diode with a plurality of semiconductor chips (typically surrounded by the peripheral shared packaging), generally of rectangular shape, is preferably at most 20 mm, better still at most 10 mm and even at most 5 mm.

The diodes are preferably power diodes which in operation are undersupplied electrically with current, preferably by a factor of at least 10 and even of at least 20 (therefore intensity/10 or even intensity/20), in particular so as to maintain a temperature below the softening point of the polymeric material of the lamination interlayer, in particular of at most 130° C., better still of at most 120° C. and even of at most 100° C.

These diodes guarantee an excellent efficiency without excessively heating.

For example, for diodes supplied with current at 1 Å, between 50 and 100 mA is chosen.

The inorganic diodes are, for example, based on gallium phosphide, gallium nitride or aluminum gallium nitride.

Mention may be made, as diodes, of the Oslon Black Flat range sold by Osram or of the Osram Sonyos PXXX range. For red light, mention may be made, as diode sold by Osram, of: Oslon Black Flat Lx H9PP. For the orange (amber) light, mention may be made, as diode sold by Osram, of: LCY H9PP. For white light, mention may be made, as diode sold by Osram, of: LUW H9QP or KW HxL531.TE, where x=is the number of chips in the diode (4 or 5, for example).

Mention may be made, as flexible PCB, of the Akaflex® range of products (in particular PCL FVV) from Krempel.

In an embodiment of the vehicle, it comprises at least one control unit for managing the diodes and even at least one sensor, in particular for detecting dangerous situations. The control unit for managing the diodes can be outside the laminated glazing or even in the laminated glazing, on or outside the diode carrier.

The glazing (windshield, rear window, side window) can comprise several instances of light signaling with the same function or separate functions.

The diodes can be arranged in order to form one or more letters, a symbol (triangle, fault or hazard symbol, and the like), an arrow, using one or more PCB boards, and the like.

In particular, for the windshield, the diodes can be arranged in order to form one or more letters, a symbol (triangle, fault or hazard symbol, and the like), one or more arrows (left and right flashing indicators), using one or more PCB boards. It is possible to have as many carriers for the diodes and assemblies of diodes as described above as necessary. For example:

a first assembly along a left-hand lateral edge, preferably closer to the bottom longitudinal edge than to the top longitudinal edge,
  a second assembly along a right-hand lateral edge, preferably closer to the bottom longitudinal edge than to the top longitudinal edge,
  a third assembly along the bottom longitudinal edge, preferably on the driver side,
  a fourth assembly at the center, preferably closer to the bottom longitudinal edge than to the top longitudinal edge.

It is possible change color (depending on the degree of safety, and the like) or else to switch on more or fewer diodes (depending on the level of safety), and the like.

The electrical tracks can be strips, in particular thin strips, for example printed or deposited by any other liquid deposition method or, for example, by physical vapor deposition. The electrical tracks can also optionally be wires.

The electrical tracks, which are for example rectilinear, can be made of metal, in particular of copper or else aluminum, tin, silver or gold. They can have a width Wp of at most 10 mm, better still of 0.2 to 2 mm, with a masking layer on top, if necessary.

The electrical tracks can also be strips, in particular broader strips, resulting from the division of an electrically conductive layer (monolayer or multilayer) made of metal (in particular made of copper or else aluminum, tin, silver or gold) or made of transparent conductive oxide, division by electrical insulation zones without the electrically conductive material. This is carried out, for example, by selective deposition, by masking by attack (laser etching, photolithography, and the like). The electrical insulation zones are, for example, strips with a width of at most 1 mm and even of at most 0.1 mm.

One or more electrical tracks can transmit data signals.

In an embodiment, the carrier for the diodes comprises a plastic film, preferably a transparent plastic film, preferably made of polyethylene terephthalate, denoted PET, a polyester, a polyimide, a polyamide, or else a poly(ethylene naphthalate), denoted PEN, or else a polybutadiene, a poly(vinyl chloride), denoted PVC, a polycarbonate, denoted PC, or a polyetheretherketone (PEEK), indeed even an acrylate. Polyimide films have a better resistance to higher temperatures in comparison with the alternative PET or even PEN. The carrier can comprise several plastic layers.

The carrier for the diodes is provided with electrical tracks, in particular made of metal or of transparent conductive oxide, equipped with surface mount diodes.

It is preferable for the conductive tracks and the film to be transparent when they are visible, that is to say in the vision area of the glazing. The electrical tracks can be transparent due to the transparent material or due to their width, which is sufficiently thin to be (virtually) invisible.

On a given carrier for the diodes, the diodes can emit the same light or light of different colors, preferably not at the same time.

Conventionally, the diodes are in (at least) one row forming a luminous strip along a longitudinal or lateral edge of the windshield (driver side) or the rear window or the side window.

The first glazing can comprise an opaque layer on face F2 (enameled frame in general) and the second glazing can comprise an opaque layer (enameled frame in general) on face F4 or on face F3. Their widths are identical or distinct. For example, in particular for a motor vehicle windshield, the width can be from 5 to 20 cm for the lower longitudinal edge, from 2 to 15 cm for the lower longitudinal edge (possible broader central zone), from 1 to 10 cm for a lateral edge.

The carrier for the diodes can be in the clear glass area, spaced out or not spaced out from the opaque edges (enameled frame in general). For example, the carrier for the diodes is positioned:
  along a lateral or longitudinal edge
  or else more central, in particular substantially halfway between the lateral edges and even closer to the lower longitudinal edge (in the mounted position) than to the upper longitudinal edge.

The carrier for the diodes (at least the diode zone) can be arranged in or in the vicinity of the region of an opaque masking layer, along a peripheral edge of the bent laminated glazing, generally (enameled frame) on face F2 and face F4 or else (enameled frame) on face F2 and on face F3.

The carrier for the diodes is polymeric or essentially polymeric, in particular sandwich material, for example including a metal sheet, in particular for combating parasitic light, on the side of the rear face of the PCB carrier.

The diode zone is preferably in a peripheral zone, for example in order to preserve the clear glass area and/or the LT, preferably at less than 15 cm or even 10 cm from the edge face of the first glazing. For example, the carrier for the diodes is positioned along a lateral or longitudinal edge, preferably at less than 15 cm from the edge, or else more central, in particular substantially halfway between the lateral edges and even closer to the lower longitudinal edge (in the mounted position) than to the upper longitudinal edge.

The diode zone can be placed in particular in the central zone on the upper longitudinal edge side (which is the usual zone of the rearview mirror). Masking can be used to conceal unnecessary and unsightly parts of the diode carrier and/or track strips in order to leave only the diodes thereof visible from the inside (respectively from the outside for the second subject matter). Any process suited to the nature can be employed: printing, such as inkjet printing, screen printing, enamel, as on the face F2, and the like.

The track strips are, for example, masked from the inside by a masking layer, preferably made of enamel, preferably on the face F3 or F4, and/or from the outside by a masking layer, preferably on the face F2, preferably made of enamel.

For the glazing having an internal luminous zone, the diode zone can be facing a gap of a masking layer, preferably made of enamel, preferably on the face F3 or F4, which gap is common to the diodes or made of several individual gaps for the diodes, or, for the glazing having external luminous signaling, the diode zone can be facing a gap of a masking layer, preferably on the face F2, preferably made of enamel, which gap is common to the diodes or made of several individual gaps for the diodes.

The common (or individual) gap can be emerging over the clear glass area. It is possible, for example, to reduce the width of the masking layer (enamel) in order to form the external edge of the gap in the zone facing the diodes.

The common (or individual) gap can be rectangular or square in shape, for simplicity.

More specifically, in a first embodiment in connection with the first subject matter, in particular for a windshield or a roof, the carrier for the diodes can even be positioned in a peripheral region of the bent laminated glazing in which the first glazing is entirely (or partially) opaque by an opaque masking layer (outermost if another masking layer is on the second glazing side), preferably on face F2. This layer can be an inorganic layer, preferably an enamel (black or any other color), or an organic layer, in particular of tinted polymer, for example made of polyethylene or of polymethyl methacrylate.

This opaque layer can be an uninterrupted layer (continuous background) optionally terminating in discontinuities, in particular decorative discontinuities (surfaces without opaque layer), in the direction of the center of the glazing (of the clear glass area), for example in the form of a set of geometric (round, rectangular, square, and the like) or nongeometric patterns of identical or distinct sizes (with a size which decreases with distance from the edge face and/or patterns which are increasingly spaced out with distance from the edge face).

In this first embodiment, the diodes, indeed even the diode zone, indeed even all or part of the track strips, can be visible solely inside:
  to display information—such as a (anticollision) warning to a driver or even to any other person, without restricting the view of the driver through a windshield,
  for decorative lighting, for example for a roof.

In addition, the second glazing can also be opaque in this region of the bent laminated glazing by an (innermost)

opaque masking layer, preferably on the face F4 or on the face F3 and/or else on one of the main faces of the lamination interlayer. This masking layer can be an inorganic layer, preferably an enamel (black or any other color), in particular on the face F4 or F3, or an organic layer, in particular of tinted polymer, for example made of polyethylene or of polymethyl methacrylate. This opaque layer is preferably an uninterrupted layer, preferably on the face F4 or F3, and which then comprises:

- at least one individual gap for each diode (by a masking on deposition or by removal, in particular with a laser), leaving the diodes visible
- or a common gap for a group of diodes or all the diodes in the diode zone, leaving the diodes visible.

The masking layer with gap(s) can protrude from the edges of the diode zone by at least 0.1 mm and even by at most 5 mm or by at most 2 mm.

A scattering layer, such as a white enamel, can be added on face F4, indeed even on F3, facing the diodes. The scattering layer can be spaced apart from or contiguous with this (innermost) opaque layer.

In particular for visual comfort, the bent laminated glazing can comprise, on the face F3 or (better still) the face F4 facing the diodes, a preferably white scattering layer, in particular a (white) enamel.

More specifically, in a second embodiment in connection with the second subject matter, the carrier for the diodes can be positioned in a region of the bent laminated glazing (rear window, side window or even windshield) in which the second glazing is opaque by an opaque masking layer (innermost if another masking layer is on the first glazing side), preferably on the face F4 or on the face F3 and/or else on one of the main faces of the lamination interlayer. This masking layer can be an inorganic layer, preferably an enamel (black or any other color), in particular on the face F4 or F3, or an organic layer, in particular of tinted polymer, for example made of polyethylene or of polymethyl methacrylate.

In this embodiment, the diodes, indeed even the diode zone, indeed even all or part of the track strips, is visible solely outside, in order to form any type of light signaling. This opaque masking layer can preferably be, in this region of the bent laminated glazing, an uninterrupted layer (continuous background) optionally terminating in discontinuities, in particular decorative discontinuities (surfaces without opaque layer), in the direction of the center of the glazing (of the clear glass area), for example in the form of a set of geometric (round, rectangular, square, and the like) or nongeometric patterns of identical or distinct sizes (with a size which decreases and/or patterns which are increasingly spaced out with distance from the edge face), in particular an enamel.

The second glazing can additionally be opaque by an (outermost) opaque masking layer, preferably on F2.

This opaque masking layer then comprises at least gaps (by masking on deposition or by removal, in particular with a laser), leaving the diodes visible. A scattering layer, such as a white enamel, can be added on face F2 or F1, facing the diodes. The scattering layer can be spaced apart from or contiguous with this opaque layer.

The masking layer with gap(s) can protrude from the edges of the diode zone by at least 0.1 mm and even by at most 5 mm or by at most 2 mm.

In particular for visual comfort, the bent laminated glazing for external signaling (side window, rear window, and the like) can comprise, facing the diodes, on the face F2 (indeed even F1), a preferably white scattering layer, in particular a (white) enamel. It is thus possible to have a set of (white) scattering patterns of the size of the diodes (preferably with a size suitable for preventing the edges from being dark in the on state).

The first glazing, like the second glazing, can be parallelepipedal, with main faces or sheets which are preferably quadrilateral, in particular rectangular, square, indeed even of any other shape (round, oval, polygonal).

The first and/or second glazing can (depending on the esthetic result or the optical effect desired) be a clear glass (with a light transmission $T_L$ greater than or equal to 90% for a thickness of 4 mm), for example a glass of standard soda-lime composition, such as Planilux® from Saint-Gobain Glass, or an extra-clear glass ($T_L$ greater than or equal to 91.5% for a thickness of 4 mm), for example a soda-lime-silica glass with less than 0.05% of Fe(III) or $Fe_2O_3$, such as the Diamant® glass from Saint-Gobain Glass or the Optiwhite® glass from Pilkington or the B270® glass from Schott, or a glass of another composition described in the document WO04/025334. It is also possible to choose the Planiclear® glass from Saint-Gobain Glass.

The glass of the first and/or second glazing can be neutral (without coloration) or (slightly) tinted, in particular gray or green, such as the TSA glass from Saint-Gobain Glass. The glass of the first and/or second glazing may have undergone a chemical or heat treatment of the hardening or annealing type or a tempering (in particular in order to obtain a better mechanical strength) or be semitempered.

The light transmission $T_L$ can be measured according to the standard ISO 9050:2003 using illuminant D65 and is the total transmission (in particular integrated over the visible region and weighted by the curve of sensitivity of the human eye), taking into account both direct transmission and possible diffuse transmission, the measurement being carried out, for example, using a spectrophotometer equipped with an integrating sphere, the measurement at a given thickness subsequently being converted, if appropriate, to the reference thickness of 4 mm according to the standard ISO 9050:2003.

The bent laminated glazing according to the invention, in particular windshield or side window, can have a $T_L$—in the clear glass area—which is preferably at least 70% and even at least 75% or even at least 80%.

The bent laminated glazing according to the invention, in particular sunroof, can have a light transmission $T_L$ of at most 10% and even of 1% to 6%.

For an automobile roof, one at least or all of the following criteria are preferred:
- an energy transmission $T_E$ of at most 10% and even of 4 to 6%,
- an energy reflection $R_E$ (preferably face F1 side) of at most 10%, better still of 4 to 5%,
- and a total transmission of the solar energy TTS <30% and even <26%, even from 20 to 23%.

A table A below gives examples of glass sold by the applicant company. The SGS Thermocontrol® Absorbing/Venus glass improves the thermal comfort by absorbing the energy load in the body of the glass. These glasses are divided into two categories: "Vision" (light transmission >70%) and "Privacy" (light transmission <70%).

TABLE A

| Type of glass | $T_L$ (%) | $T_E$ (%) | $R_E$ (%) |
|---|---|---|---|
| SGS Thermocontrol ® Venus Green 55 | 49 | 27 | 7 |
| Green-tinted high-performance/Clear glass | 28 | 16 | 3 |
| SGS Thermocontrol ® Venus Green 35 | 35 | 22 | 5 |
| SGS Thermocontrol ® Venus Grey 10 | 10 | 8 | 1 |
| SGS Thermocontrol ® Absorbing TSA3+ | 71 | 44 | 18 |
| Standard green glass | 78 | 53 | 25 |

The "Vision" glass is suitable for all types of glazing in the vehicle: green/blue/gray, and provides a reduced energy transmission ($T_E$). The most popular color for this purpose is green. It has been chosen due to its neutral appearance, which does not affect the harmony of the colors of a vehicle.

The "Privacy" glass is a glazing which is bulk-tinted for thermal comfort and privacy. It is glazing that is supertinted dark green or dark gray. In order to ensure privacy, this glazing exhibits light transmission values which are below 70%, generally around 55% or less. Due to its dark tint, this type of glass also provides a low UV transmission (UV rays can cause skin irritation).

In most countries, Venus/Privacy glass is suitable for the rear side windows (after the B-pillar), rear window and roof.

SGS Thermocontrol® Venus consists of dark gray or dark green supertinted glazing. They have all the thermal advantages of the "Vision" (SGS Thermocontrol® type) glass with improved solar protection:
  lower energy transmission values (compared to all the other glass solutions),
  its dark color else blocks UV radiation, which is responsible for skin irritation and discoloration of the passenger compartment,
  offers greater privacy for the vehicle's passengers (it is difficult to see through the glass from the outside).

Preferably, the bent laminated glazing forms a windshield of a road vehicle, such as an automobile or a truck.

The bending of the first and second glazings (in particular windshield) can be in one or more directions, for example as described in the document WO2010136702. The area of the main face F1 (windshield or roof, in particular) can be greater than 1.5 m² and be, for example, less than 3 m².

The first edge face (like the second edge face) can be a longitudinal edge face with a length Li of 1 to 3 m (in particular for a windshield or a roof or a rear window) or else of 0.1 to 1 m (in particular for a side window).

The first edge face (like the second edge face) can be a lateral edge face with a length Lj of 0.5 to 2.5 m (in particular for a windshield, in particular a panoramic windshield, or a roof or a rear window) or else of 0.1 to 1 m (in particular for a side window).

The exterior glazing can comprise thin functional layers on one or other of its faces F1 and F2 or else both: mention may be made of a photocatalytic self-cleaning or hydrophobic layer on face F1.

In order to limit heating in the passenger compartment or to limit the use of air conditioning, one of the glazings at least (preferably the exterior glass) is tinted, and the laminated glazing can also comprise a layer which reflects or absorbs solar radiation, preferably on face F4 or on face F2 or F3, in particular a transparent electrically conductive oxide layer, a "TCO layer", (on face F4) or even a stack of thin layers comprising at least one TCO layer, or stacks of thin layers comprising at least one silver layer (on F2 or F3), the or each silver layer being positioned between dielectric layers.

It is possible to simultaneously have a (silver-containing) layer on face F2 and/or F3 and a TCO layer on face F4.

The TCO layer (of a transparent electrically conductive oxide) is preferably a layer of fluorine-doped tin oxide ($SnO_2$:F) or a layer of mixed indium tin oxide (ITO).

Other layers are possible, including thin layers based on mixed indium zinc oxides (referred to as "IZOs"), based on gallium-doped or aluminum-doped zinc oxide, based on niobium-doped titanium oxide, based on cadmium or zinc stannate, or based on antimony-doped tin oxide. In the case of aluminum-doped zinc oxide, the doping level (that is to say, the weight of aluminum oxide with respect to the total weight) is preferably less than 3%. In the case of gallium, the doping level can be higher, typically within a range extending from 5 to 6%.

In the case of ITO, the atomic percentage of Sn is preferably within a range extending from 5 to 70% and in particular from 10 to 60%. For layers based on fluorine-doped tin oxide, the atomic percentage of fluorine is preferably at most 5% and generally from 1 to 2%.

ITO is particularly preferred, especially with respect to $SnO_2$:F. Of higher electrical conductivity, its thickness can be smaller to obtain one and the same emissivity level. Easily deposited by a cathode sputtering process, in particular a magnetron cathode sputtering process, these layers are characterized by a lower roughness and thus a lower tendency to foul.

One of the advantages of fluorine-doped tin oxide is, on the other hand, its ease of deposition by chemical vapor deposition (CVD), which, contrary to the cathode sputtering process, does not require a subsequent heat treatment and can be implemented on the float flat glass production line.

The term "emissivity" is understood to mean the normal emissivity at 283 K within the meaning of the standard EN12898. The thickness of the low-emissivity (TCO, and the like) layer is adjusted, depending on the nature of the layer, so as to obtain the desired emissivity, which depends on the sought-for thermal performance qualities. The emissivity of the low-emissivity layer is, for example, less than or equal to 0.3, in particular less than or equal to 0.25 or even less than or equal to 0.2. For layers made of ITO, the thickness will generally be at least 40 nm, indeed even at least 50 nm and even at least 70 nm, and often at most 150 nm or at most 200 nm. For layers made of fluorine-doped tin oxide, the thickness will generally be at least 120 nm, indeed even at least 200 nm, and often at most 500 nm.

For example, the low-emissivity layer comprises the following sequence: high-index underlayer/low-index underlayer/a TCO layer/optional dielectric overlayer.

It is possible to choose, as preferred example of low-emissivity layer (protected during a tempering), high-index underlayer (<40 nm)/low-index underlayer (<30 nm)/an ITO layer/high-index overlayer (5-15 nm)/low-index barrier overlayer (<90 nm)/final layer (<10 nm).

Mention may be made, as low-emissivity layer, of those described in the patent US2015/0146286, on the face F4, in particular in examples 1 to 3.

In particular, the face F4 of the laminated glazing is coated with a transparent functional layer, in particular a low-emissivity layer, preferably comprising a TCO layer, including a zone (supplied with electricity and thus an electrode) forming a touch button (for managing the first luminous surface).

Naturally, the lamination interlayer can be in direct contact with the face F3 (respectively F2 for the second subject matter) or with a conventional functional coating on this face, in particular a stack of thin layers (including one or more silver layers), such as: heating layer, antennae, solar control or low-emissivity layer or a decorative or (opaque) masking layer, such as an enamel, generally black or any other color.

In one embodiment of the present invention, the lamination interlayer exhibits, in a heating zone (covering all or part of a main face), a plurality of individual metal wires preferably placed on the main face on the side opposite those, called "heating metal wires", which connect together current lead strips or "busbars". The heating zone can be, in all or part, in the diode zone and/or the zone of the track strips. Preferably, the wires are placed on the main face opposite that front face side of the diode carrier (thus face F'3 for the first subject matter and face F'2 for the second subject matter).

The heating current passes through these individual metal wires. The wires are advantageously very thin so as not to damage, or only very slightly damage, the transparency of the window. Preferably, the metal wires have a thickness of less than or equal to 0.1 mm, in particular of between 0.02 and 0.04 mm and ideally between 0.024 mm and 0.029 mm. The metal wires preferably contain copper, tungsten, gold, silver or aluminum or an alloy of at least two of these metals. The alloy can also contain molybdenum, rhenium, osmium, iridium, palladium or platinum. The metal wires are preferably electrically insulated, for example by means of sheathings. This is particularly useful when the wires are under voltage of the window.

The invention relates, of course, to any vehicle comprising at least one luminous signaling glazing such as described above and in particular:
- the glazing having an internal luminous zone forming a windshield, the light is an (open road (highway) or even urban) anticollision means, in particular preventing collisions by detection of a distance to the car (or any other means of locomotion, such as a motorcycle, bicycle, scooter, and the like, or else an animal) in front (or from an object or a person, such as a pedestrian) which is too short, or else by detection of an excessively short distance from an object or a person or a car or any other means of locomotion (bicycle, motorcycle, and the like) on the left-hand or right-hand side of the car, and turning on the preferably red or, more gradually, orange (amber) then red diodes, or even diodes with three or more levels and thus colors,
- or the external luminous signaling glazing forming the rear window is a glazing including a stop lamp (for example at least 60 cd), a third stop lamp (for example between 25 and 80 cd), an indicator (for example at least 50 cd), a hazard warning lamp or a lamp for locating the vehicle,
- the external luminous signaling glazing forming a side window is a glazing including a hazard warning lamp (for when the car breaks down, and the like) or a lamp for locating the vehicle (when stopped, in a parking lot, in town, and the like) or a turn signal indicator (front side window—in particular near the outside mirror—in order to be seen when the vehicle is being overtaken, for example between 0.6 and 20 cd).

It is also possible to form clearance lamps, parking lamps or side marker lamps.

The present invention is now explained in greater detail with reference to the appended figures, in which:

FIG. 2 shows a partial diagrammatic view in section of a bent laminated vehicle glazing having an internal luminous zone in an embodiment of the invention.

FIG. 2' shows a partial diagrammatic view in section of a bent laminated vehicle glazing having an external luminous zone in an embodiment of the invention.

FIG. 3 shows a partial diagrammatic view in section of a bent laminated vehicle glazing having an internal luminous zone in an embodiment of the invention.

FIGS. 2a, 2b each show a partial diagrammatic front view of a bent laminated vehicle glazing having an internal luminous zone in an embodiment of the invention.

FIGS. 4i to 4n show internal glazings with their internal masking layer and FIGS. 4i'to 4n'show external glazings with their external masking layer and the carriers for the diodes according to the invention.

FIGS. 5, 6, 7, 8, 9, 10, 11 each show a partial diagrammatic front view of a bent laminated vehicle glazing having an internal luminous zone in an embodiment of the invention.

Figure 12:
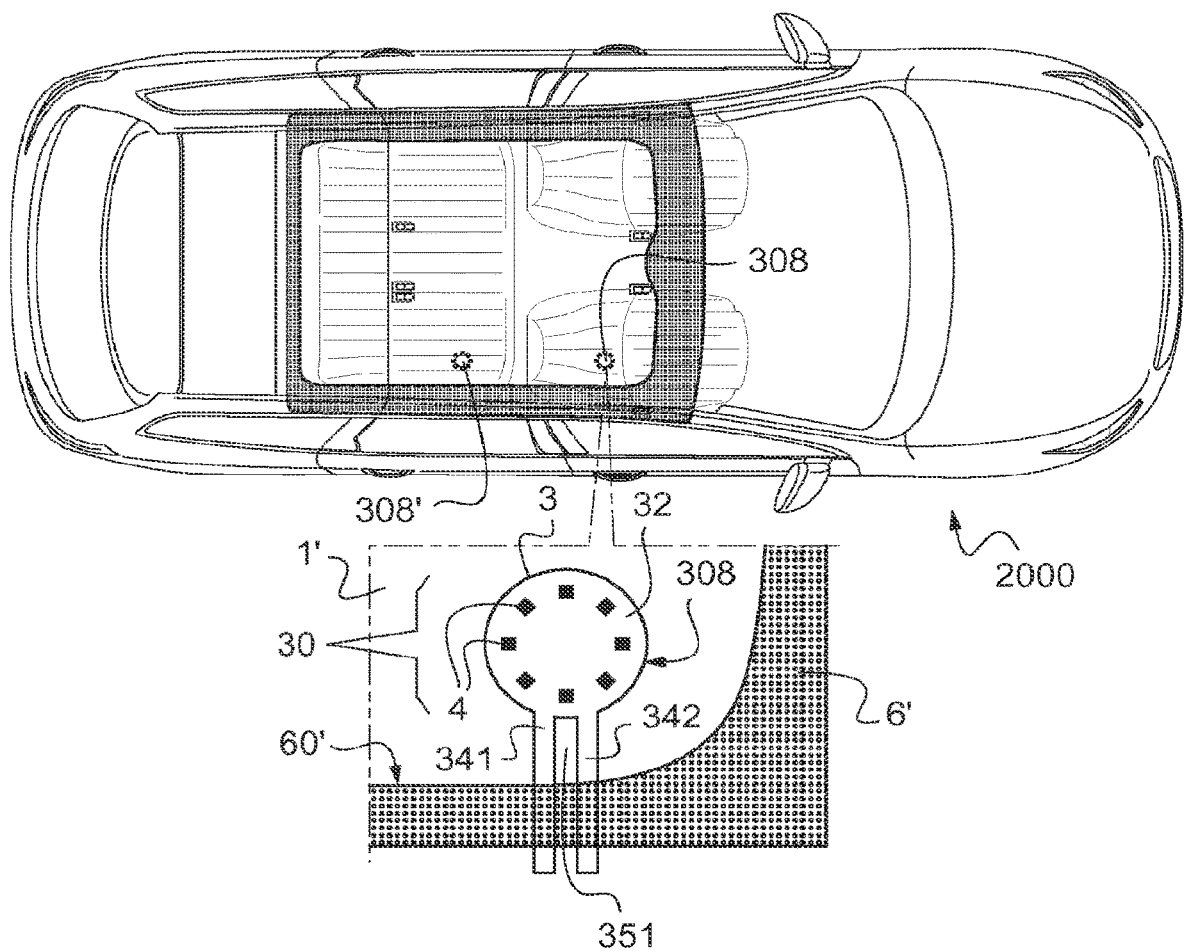
Figure 13:
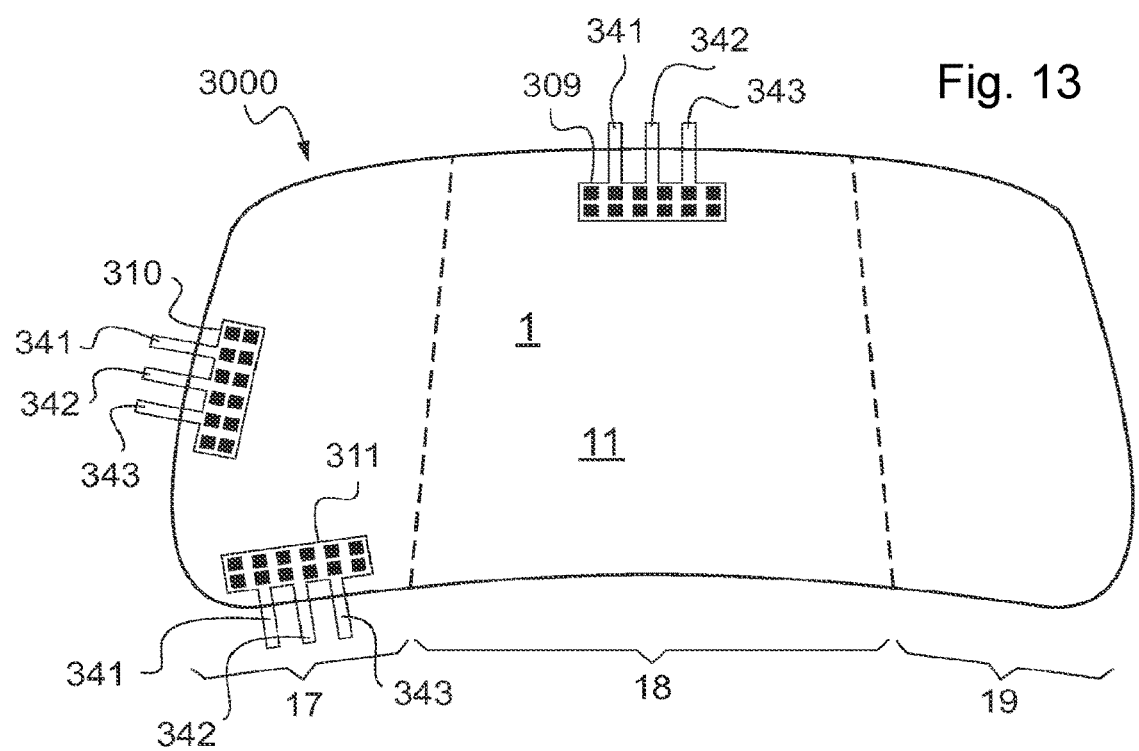

FIG. 12 shows a diagrammatic view, on the face F1 side, of a bent laminated sunroof mounted on a motor vehicle on a road, a roof with the internal luminous zone in an embodiment of the invention FIG. 13 is a diagrammatic front view, face F1 side, of a rear window having external luminous signaling in an embodiment of the invention.

Figure 14:
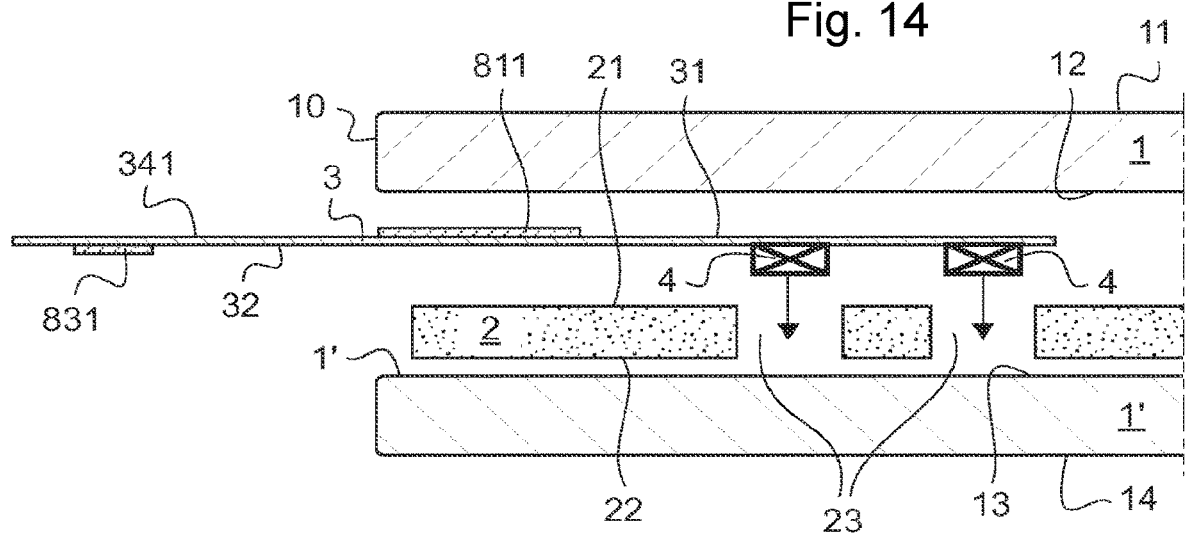

FIG. 14 is an exploded diagrammatic view of a bent laminated vehicle glazing in an embodiment of the invention.

The elements drawn are not to scale.

Figure 1:
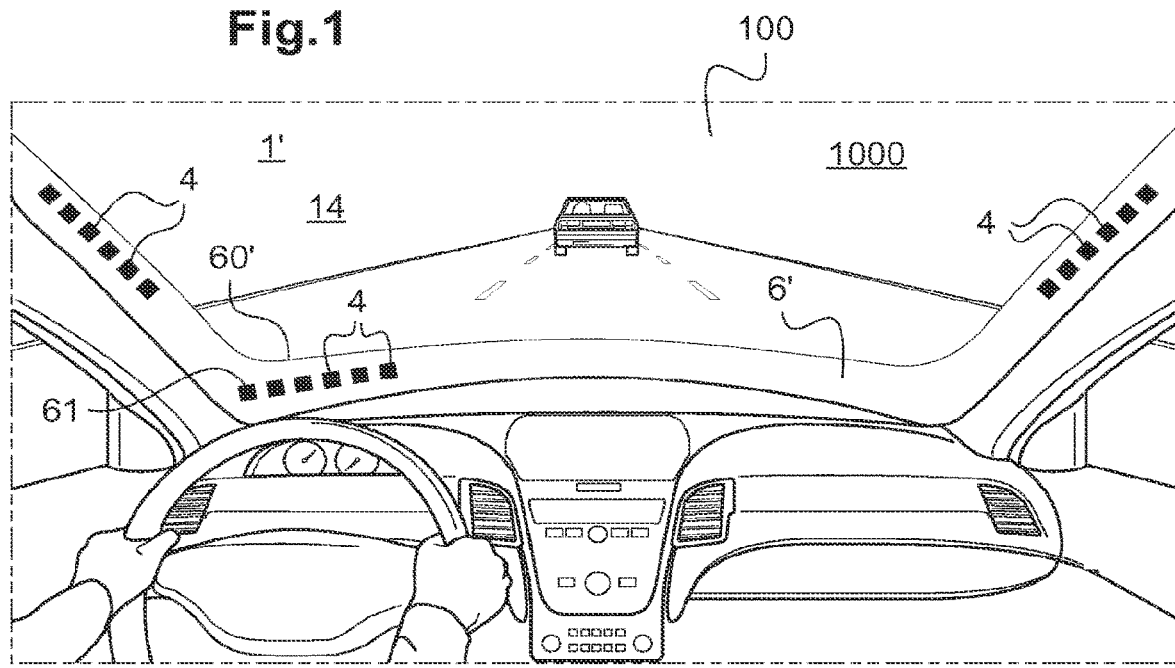
FIG. 1 shows, on the face F4 side, a diagrammatic view of a windshield mounted on a motor vehicle on a road, a windshield with the internal luminous zone in an embodiment of the invention FIG. 1' shows a diagrammatic view in section of diodes mounted on a diode carrier according to the invention.
Figure 1:
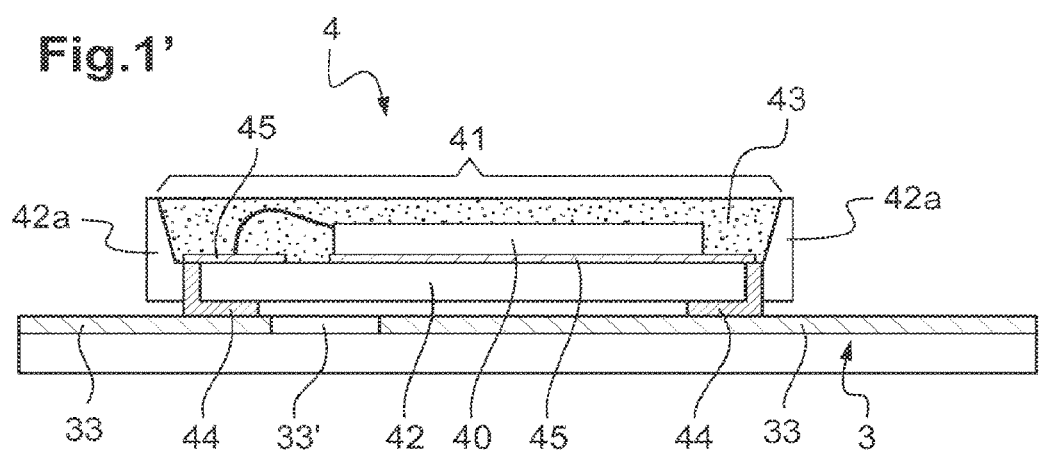

FIG. 1 shows (as seen from inside the vehicle) a windshield 1000 of a motor vehicle traveling on a three-lane road with a car in front.

The windshield is a bent laminated glazing with first and second glazings with the internal luminous signalling 100 visible by transparency from the side of the innermost main face 14 of the internal glazing.

The windshield comprises:
- a first assembly of six inorganic light-emitting diodes 4 mounted on a first printed circuit board, for example opaque, the diode region of which is incorporated between the first and second glazings, which diodes are, for example, polychromatic and in a row and are positioned in an edge zone of the windshield along the lower longitudinal edge in particular on the driver's side (for help in optimized driving), which diode zone is in front of a peripheral masking zone (enamel, and the like) of the first glazing or exterior glazing and behind a peripheral masking zone (enamel, and the like) of the second glazing or interior glazing 1' in which are inserted individual gaps 61 which allow the light of the diodes 4 to pass,
- a second assembly of six inorganic light-emitting diodes 4 mounted on a second printed circuit board, for example opaque, the diode region of which is incorporated between the first and second glazings, which diodes are, for example, polychromatic and in a row and are positioned in an edge zone of the windshield along the (left) lateral edge in particular on the driver's side, which diode zone is in front of a peripheral masking zone (enamel, and the like) of the exterior glazing and behind a peripheral masking zone (enamel, and the like) of the interior glazing in which are inserted individual gaps which allow the light of the diodes to pass, a third assembly of six inorganic light-emitting diodes 4 mounted on a third printed circuit board, for example opaque, the diode region of which is incorporated between the first and second glazings, which diodes are, for example, polychromatic and in a row and are positioned in an edge zone of the windshield along the right lateral edge in particular on the navigator's side, which diode zone is in front of a peripheral masking zone (enamel, and the like) of the exterior glazing and behind a peripheral masking zone (enamel, and the like) of the interior glazing in which are inserted individual gaps which allow the light of the diodes to pass.

These diodes, in particular of the first assembly, can emit red light, alerting the driver when the car in front (or any other means of locomotion or else an animal) is detected as too close. The red light can be continuous or flashing. The light chosen to be continuous can increase in intensity as the car in front gets closer or from a preset distance, the "high-risk distance". The frequency of light chosen to be flashing can increase as the car in front gets closer or from a preset distance, the "high-risk distance".

When the car in front is sufficiently far away (observation of the safe distance), the diodes are turned off.

These diodes, in particular of the second assembly, can emit red light, alerting the driver when a car (or any other means of locomotion or else an animal) is detected as too close on the left-hand side of the car. The red light can be continuous or flashing. The light chosen to be continuous can increase in intensity as the car to the side gets closer or from a preset distance, the "high-risk distance". The frequency of light chosen to be flashing can increase as the car to the side gets closer or from a preset distance, the "high-risk distance". When the car to the side is sufficiently far away, the diodes are turned off.

These diodes, in particular of the third assembly, can emit red light, alerting the driver when a car (or any other means of locomotion or else an animal) is detected as too close on the right-hand side of the car. The red light can be continuous or flashing. The light chosen to be continuous can increase in intensity as the car on the right-hand side gets closer or from a preset distance, the "high-risk distance". The frequency of light chosen to be flashing can increase as the car to the side gets closer or from a preset distance, the "high-risk distance". When the car to the side is sufficiently far away, the diodes are turned off.

The anticollision system operates on any road: highway, urban. It can also serve to warn of the excessively close presence of an object, of a pedestrian, and the like.

The signaling light can also change from one color (for example orange or amber) when the vehicle is at a risky distance to another color, for example red, when the vehicle is at a shorter and even more dangerous distance.

In these cases, as many diodes as necessary are provided, for example one row with an alternation of red diodes and orange diodes, or one row per color. It is also possible to have at least three signaling levels (three colors).

The vehicle incorporates at least one sensor (preferably one per assembly of diodes having the same function) in order to detect these dangerous situations (nonobservation of the safe distance, or others) and at least one control unit for managing the diodes, for example outside the windshield.

For this warning function, any PCB board with diodes is preferably in the lower quadrant on the driver's side.

The diodes 4 are not necessarily in a row, parallel to the edge of the glazing; they can form luminous patterns, for example pictograms.

FIG. 1' shows a view in section of diodes mounted on a carrier for diodes according to the invention.

The inorganic light-emitting diode 4 is a surface mount device (SMD) then comprising a peripheral packaging 42a. Each diode is an electronic component including at least one semiconductor chip 40, and is equipped with the polymeric or ceramic peripheral packaging 42a forming a peripheral encapsulation of the edge face of the electronic component. The diode is top emitting.

The packaging can correspond to the maximum thickness (height) E2 of the diode. The packaging is, for example, made of epoxy. A polymeric packaging can optionally shrink (the final thickness after lamination can be less than the initial thickness) during the lamination. The (polymeric) packaging can be opaque.

The packaging (which is monolithic or made of two segments) can comprise a part forming a seating 42 carrying the chip 40 and a part forming a reflector at a distance from the seating and higher than the chip, containing a protective resin 43 and/a material having a color conversion function. The front surface 41 can be defined as the surface of this material covering the chip set back from or level with the "front" surface of the reflector.

The anode and cathode contacts 44 are produced, for example, by conductive adhesive bonding to an electrically conductive layer with an insulated zone 33'. The contacts are prolonged by via holes into the seating as far as zones of layers 45, the one 45 connected by a wire to the cathode.

FIG. 2 is a diagrammatic sectional view of a windshield having internal luminous signaling 200 in an embodiment of the invention, comprising a bent laminated glazing comprising:

a first glazing 1, for example made of TSA glass of the applicant company and with a thickness E1 equal to 2.1 mm, forming the exterior glazing, which is preferably tinted, with first and second main faces 11, 12, respectively "face F1" and "face F2", and an edge face 10, a second glazing 1', forming the interior glazing, for example made of clear or extra-clear glass and with a thickness T'1 of 2.1 mm or even of 1.6 mm or even less, with third and fourth main faces 13, 14, respectively "face F3" and "face F4", the face F4 optionally coated with a functional layer (low-emissivity, and the like), and with a second edge face 10' by the first edge face, preferably set back from the first edge face, for example by at most 1 mm, the face F2 and the face F3 being the internal faces 11, 11' of the bent laminated glazing, between the glazings, a lamination interlayer 2 made of polymeric material, in this instance made of PVB, preferably clear or extra-clear, with a thickness E2 which is preferably submillimetric, for example a PVB (for example RC41 from Solutia or from Eastman) of approximately 0.76 mm, or in an alternative form, if necessary, a (three-layer or four-layer) acoustic PVB, for example with a thickness of approximately 0.81 mm, and even optionally a wedge-shaped PVB (for a head-up display), this PVB having a main face 21, "F'2", in adhesive contact with the face F2 and a main face 22, "F'3", in adhesive contact with the face F3 and an edge face 20 by the first edge face 10, "other edge face", the face F'3 on the face F3 side optionally carrying an assembly of (heating) metal wires (substantially) covering the surface of the windshield, in particular facing diodes, in particular virtually invisible wires, for example of 50 μm, in the form of straight or nonstraight lines.

The windshield additionally comprises a printed circuit board 3 with electrical tracks 33 and carrying, in the laminated zone, an assembly of inorganic light-emitting diodes 4, surface mounted (SMD) on the board 3 and having a light-emitting face facing the face F3 capable of emitting light in the direction of the face F3, for example emitting in the red region or in the green region. The diodes 4 have a thickness E4 which is less than E2, preferably at most 0.8 mm. The distance H between the emitting face of the diodes and the face F3 is preferably nonzero and preferably at most 0.5 mm and even ranging from 0.1 to 0.3 mm. The PVB is absent or present between the emitting face of the diodes and the face F3, depending on the manufacturing process.

The board 3 forming the carrier for the diodes is flexible, of submillimetric thickness E3, for example from 10 or 50 to 200 μm, for example a polymer, such as a polyimide (and optionally a sandwiched metal sheet). It comprises, on the front face 32, face F3 side, electrically conductive zones for supplying with electricity, "electrical tracks", 33 spaced out by insulation zones 33', a portion or all of the electrical tracks supplying the diodes. The lamination interlayer is present between the front face 32 and the face F3.

The carrier for the diodes 3 comprises several zones:
between the faces F2 and F3, the "diode zone" 30, comprising said diodes 4, for example two rows of 8 diodes parallel to one another along the first edge face, which diode zone is defined by a length L0 of at least 6 cm along the first edge face, and for example by a width W0 of at most 10 cm and even of at most 5 cm and preferably of at least 1 cm,
an emerging electrical supply zone 34, prolonging the diode zone 30 and extending in the direction of the first edge face 10 and emerging from the other edge face 20, comprising a supply zone, "internal zone", with the electrical tracks, between the faces F2 et F3, defined by a width Wt (parallel to L0) which is less than L0, which internal zone is prolonged by a supply zone beyond the other edge face 20, "protruding zone".

The internal zone is divided into a plurality of "track" strips carrying electrical tracks, with an individual width Wi of less than 5 cm in the internal zone, emerging track strips of the other edge face. The total width Wt of the internal zone (sum of the Wi values) is of more than 5 cm in order to increase the number of electrical tracks as much as possible. The track strips are, for example, in the protruding zone with the same width Wi.

In the internal zone, the lamination interlayer 2 is present on the track strips and in the space, "interstrip space", between neighboring track strips, with a width $W_S$ of at least 5 mm and even of at most 20 cm.

In the protruding zone, the carrier for the diodes 3 is curved with a terminal part in a zone at the periphery of the face F4, adhesively bonded with a double-sided adhesive tape 83, "external tape", on the front face of the carrier for the diodes. The curved zone is in this instance set back from the edge face 10.

A zone of the rear face comprises an adhesive 91 for fixing a metal frame, for example the body 9 of the vehicle, and facing the zone of the external tape on the front face for the leaktightness. The adhesive is, for example, at a distance of at least 0.5 mm and of at most 5 cm from the second edge face 10' and has a width between 5 and 15 mm.

The terminal part is connected to a connector 7, for example at more than 5 cm from the edge face 10'. Between the curved zone and the metal frame, there may be other elements (lip, insert, and the like) which possibly will be attached to the face F4. It is possible to adjust the distance of the adhesive 91 with respect to the second edge face 10'. The carrier for the diodes comprises, on the front face, another electronic component 5 of submillimetric thickness E5 chosen from one at least of the following elements: a resistive element, a capacitive element, a transistor or a microcontroller.

The windshield additionally comprises an adhesive leaktight to liquid water 81, in the form of double-sided adhesive tape, positioned between the face F2 and the rear face 31 of the diode carrier in a portion of the rear face (leaving a surface area of the rear face against the face F2). This tape has a thickness E8 which is submillimetric, preferably of at most 0.2 mm, better still of at most 0.1 mm and better still of at most 0.05 mm; in particular, E3+E8 is preferably at most 0.15 mm. Preferably, it is present in the lamination zone, protrudes from the other edge face and even protrudes from the curved zone, in order to be certain that, from the edge face 10, there is no rear face and face F2 contact.

It is possible to choose, for example, the product 9496LE Clear 3M from 3M for this tape, as for the external tape.

For an alternative glazing with a polymeric encapsulation (for example a roof), such as polyurethane, these double-sided adhesive tapes 81, 83 can be used for leaktightness at the time of an injection of the liquid composition.

The carrier for the diodes 3 and in particular the track strips is masked from the outside by a "external" masking layer 6 made of enamel on the face F2. The track strips are masked from the inside by a "internal" masking layer made of enamel 6' on the face F4 or, in an alternative form, on the face F3. The internal edge 60' of the internal layer 60 is set back from the internal edge 60 of the external layer 6 in order to allow the light from the diodes to pass.

It is possible to choose, as diodes, Oslon Black Flat LUW H9QP diodes.

FIG. 2' shows a partial diagrammatic view in section of a bent laminated vehicle glazing having an external luminous zone 200' in an embodiment of the invention. It differs from that described in FIG. 2 in that the diode carrier 3 is on the face F3, for example with a row of polychromatic diodes 4, with the curved zone still extending as far as the face F4. The front face 32 is directed toward the face F2 side (rear face 31 toward the face F3 side). The internal edge 60 of the external masking layer 60 is set back from the internal edge 60' of the internal masking layer 6' on the face F3 (or, in a preferred alternative form, on the face F4) in order to allow the light from the diodes 4 to pass.

FIG. 3 shows a partial diagrammatic view in section of a bent laminated vehicle glazing having an internal luminous zone 300' in an embodiment of the invention. It differs from that described in FIG. 2 in that the internal edge 60' is facing the internal edge 60. The internal masking layer 6' comprises individual gaps 61 in order to allow the light from the diodes 4 to pass. The component 5 is outside the lamination in the curved zone. In an alternative form, the internal masking layer is on the face F3. An athermic and/or heating layer 16 is on the face F3 or, in an alternative form, on a plastic film, such as a PET sandwiched in PVB.

FIGS. 2a, 2b each show a partial diagrammatic front view of a bent laminated vehicle glazing having an internal luminous zone in an embodiment of the invention. The masking layers on the glazings are not represented in order to see the elements and also the portion of the electrical tracks extending as far as the diodes. The PVB 2 is set back from the second edge face 10'.

The diode zone 30 is a rectangular strip parallel to the edge face 10, with a width W0 of 5 cm and with a length L0 of 10 cm. There are four diodes 4 in a row.

The emerging zone 34 comprises, on the front face 32, two track strips 341 and 342 with the electrical tracks 33, for example of 1 mm and made of copper. Each track strip is folded over the face F4 14 (front face 32 face F3, F4 side) and is connected to an individual connector 7 (or, in an alternative form, a common collector). The curved zone is set back from the edge face 10 of the first glazing.

FIG. 2b differs from FIG. 2a in that the second glazing exhibits a notch 15', for example of 2 mm, in which the track strips 341 and 342 are curved. PVB 2 set back from the second edge face 10' can be present on the notch 15'.

FIGS. 4i to 4m show, in front view, internal glazings 1' with their internal masking layer forming a masking frame 6' made of enamel (on the face 14, "F4") and FIGS. 4i' to 4m' show, in front view, external glazings 1 with their external masking layer on the face 12, "F2", forming a masking frame 6 made of enamel masking the carriers for the diodes 3.

The internal edge 60' of the layer 6' can have a graduated transition of patterns toward the center of the glazing. The layer 60' has common or individual gaps 61, 62', for allowing the light from the diodes to pass, in the diode zone 30 while masking the three track strips 341, 342, 343, for example along the lower longitudinal edge or even in a thicker central zone of the lower longitudinal edge (location of a rearview mirror, and the like).

FIGS. 4m' to 4n' show, in front view, external glazings 1 with their external masking layer on the face 12, "F2", forming a masking frame 6 made of enamel masking the track strips 34. The diode zone is in the clear glass area nearby and preferably the carrier and the electrical tracks are transparent FIGS. 4m to 4n show, in front view, internal glazings 1' with their internal masking layer forming a masking frame 6' made of enamel (on the face 14, "F4") or even without masking frame (FIG. 4n).

FIGS. 5, 6, 7, 8, 9, 10, 11 each show a partial diagrammatic front view of a bent laminated vehicle glazing having an internal luminous zone in an embodiment of the invention. The masking layers on the glazings are not represented in order to see the elements and in this instance the carriers are not shown folded.

Figure 5:
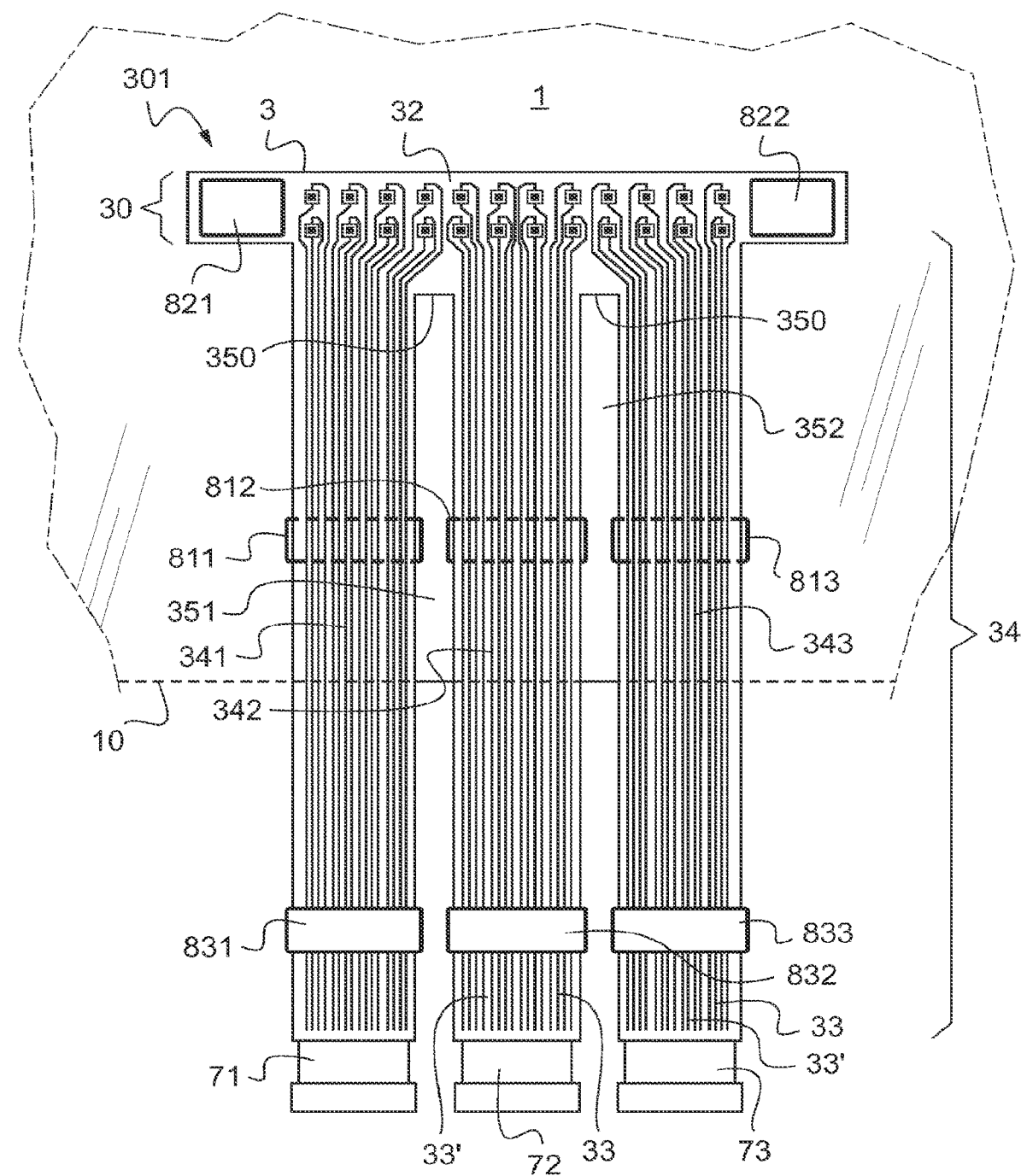
Figure 6:
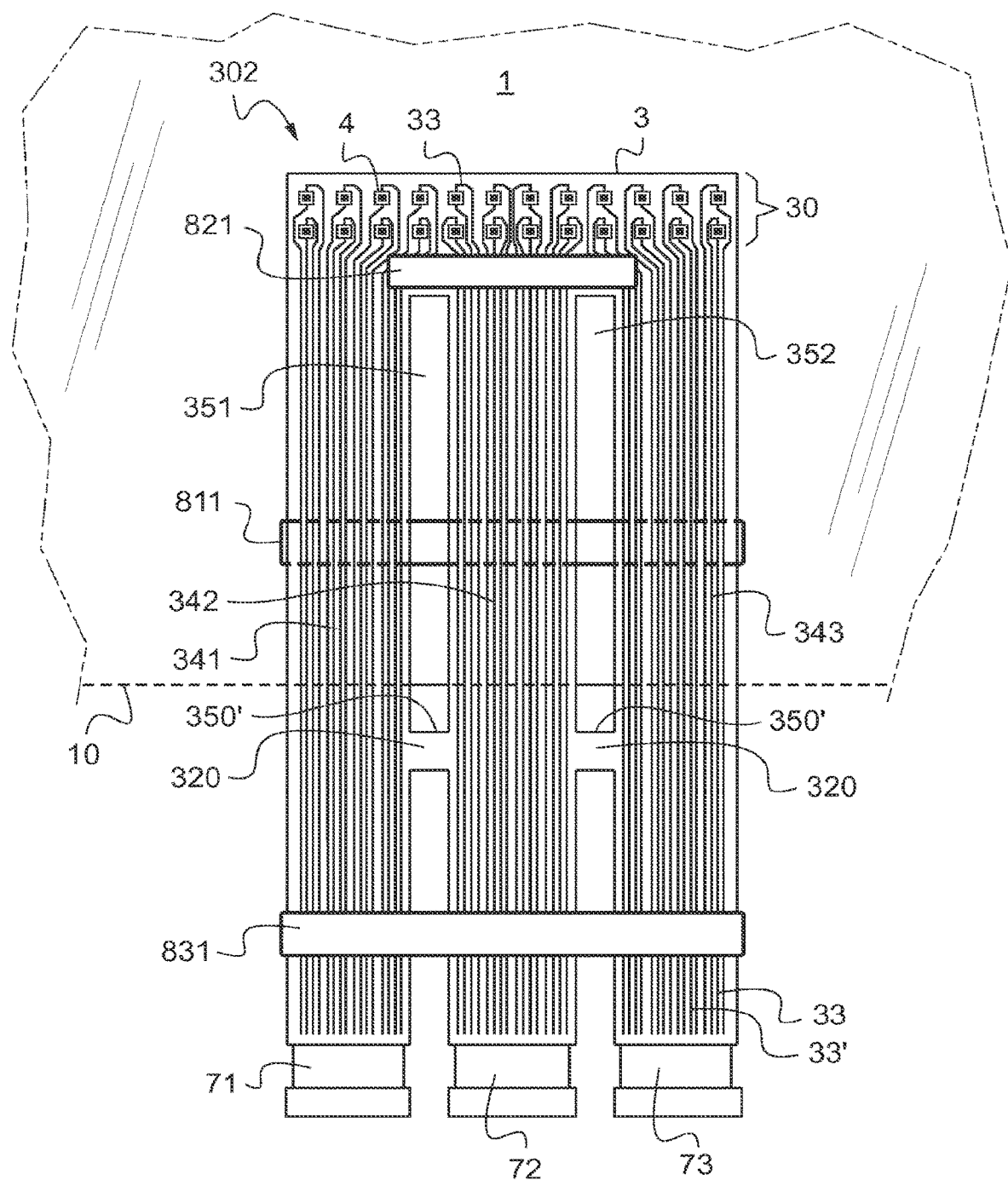
Figure 7:
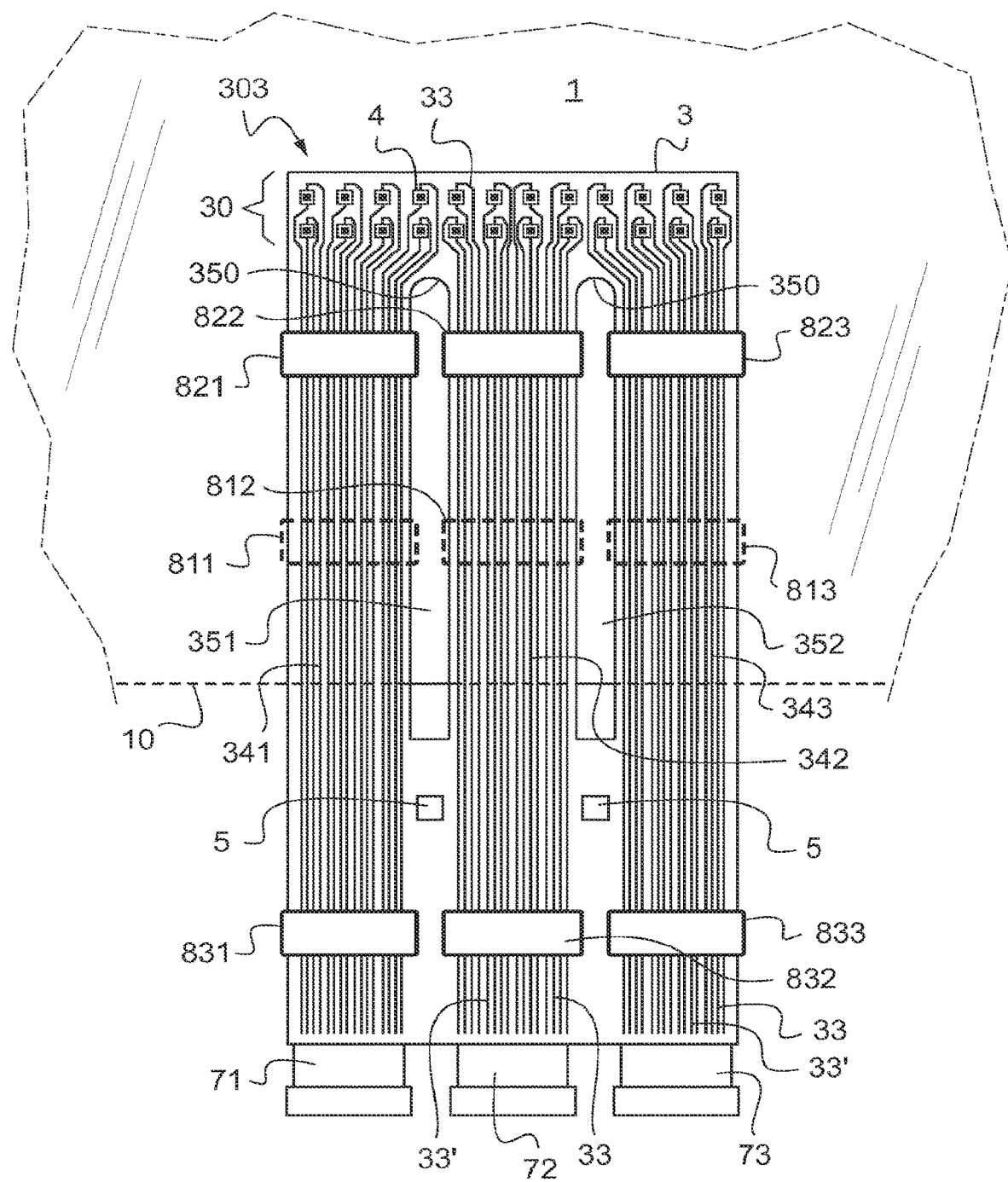

In FIGS. 5 to 7, the diode zone 30 is a rectangular strip parallel to the edge face 10, with a width W0 of 5 cm and with a length L0 of more than 12 cm. There are two rows of twelve diodes 4.

The emerging zone 34 of the edge face 10 comprises three track strips 341 to 343 with a width of 4 cm spaced out by 1 cm. The interstrip space 351 and 352 is filled with PVB. Each of the interstrip space 351 and 352 has an end 350' near zone 320. The rear faces of the track strips are adhesively bonded to the face F2 by individual double-sided adhesive tapes 811, 812, 813 or by a common tape 811, for leaktightness.

For good positioning, one or more double-sided adhesive tapes 821, 822, 823 is/are placed on the front face 32, with a thickness of at most 0.2 mm, for example transparent, on either side of the rows of diodes or under the innermost row or on the track strips. It is possible to choose, for example, the product 9496LE Clear 3M from 3M.

The track strips are in the protruding zone with the same width Wi and are sometimes connected (FIGS. 6 and 7) over a width D of at least 0.5 cm and preferably redeployed as strips (FIG. 6) as far as a terminal part of the diode carrier leading to the connectors 71, 72, 73.

The track strips can have, in the emerging zone, on the front face, a common or individual double-sided adhesive tape 831, 832, 833. The carrier 301 to 303 can carry other components 5.

The edge face of the diode zone 30 defines "linking" zones 350 between neighboring track strips which are straight (FIG. 5) or else arc-shaped (FIG. 7).

Figure 8:
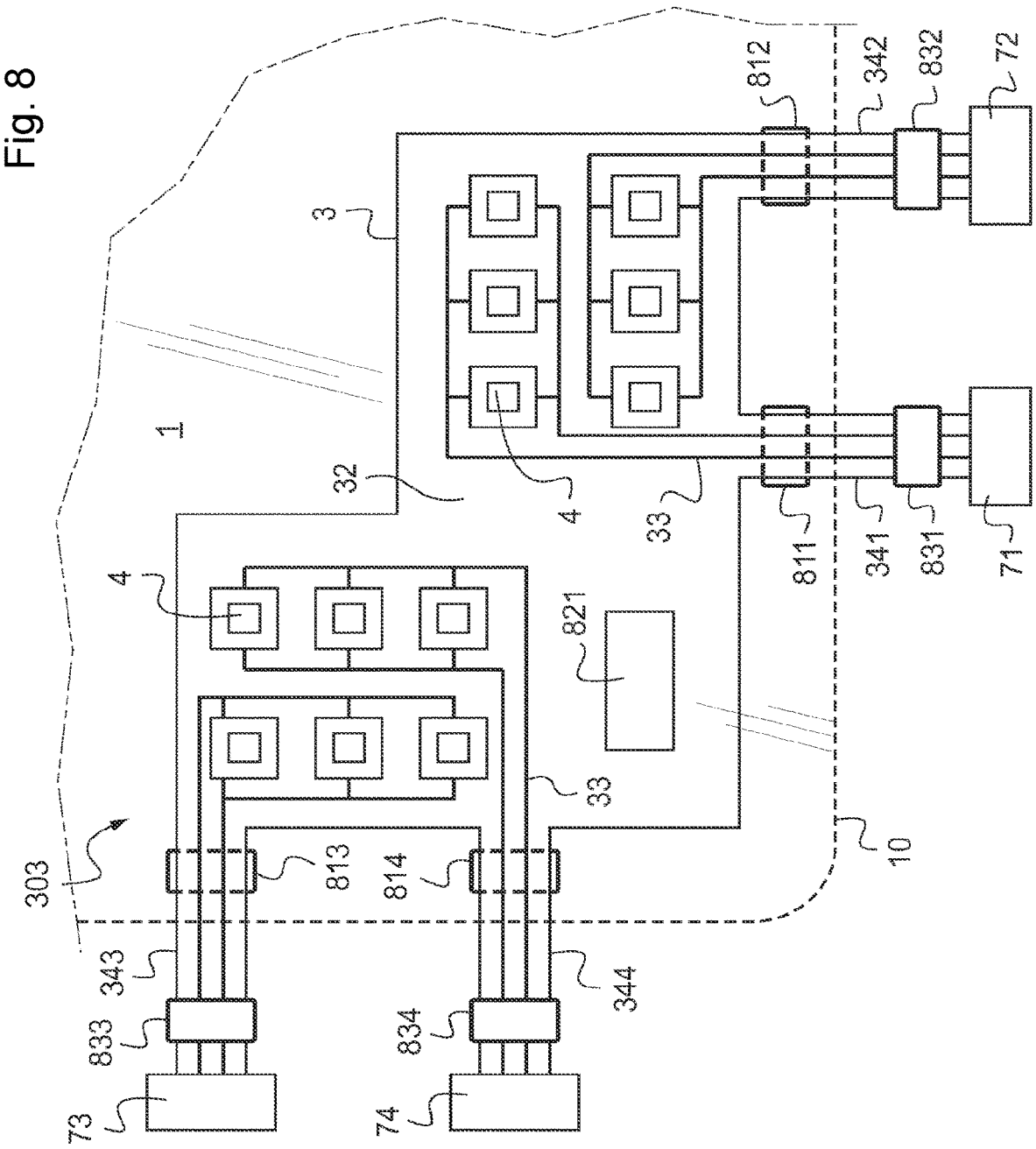

In FIG. 8, the L-shaped carrier 303 comprises two diode zones each with two emerging tracks strips 341 to 344 on adjacent edge faces of the second glazing 1'. The alignment adhesive tape 821 is between the diode zones. The tracks strips 341 to 344 lead to connectors 71, 72, 73, 74, respectively. The tracks strips 341 to 344 are bonded by individual double-sided adhesive tapes 811, 812, 813, 814.

Figure 9:
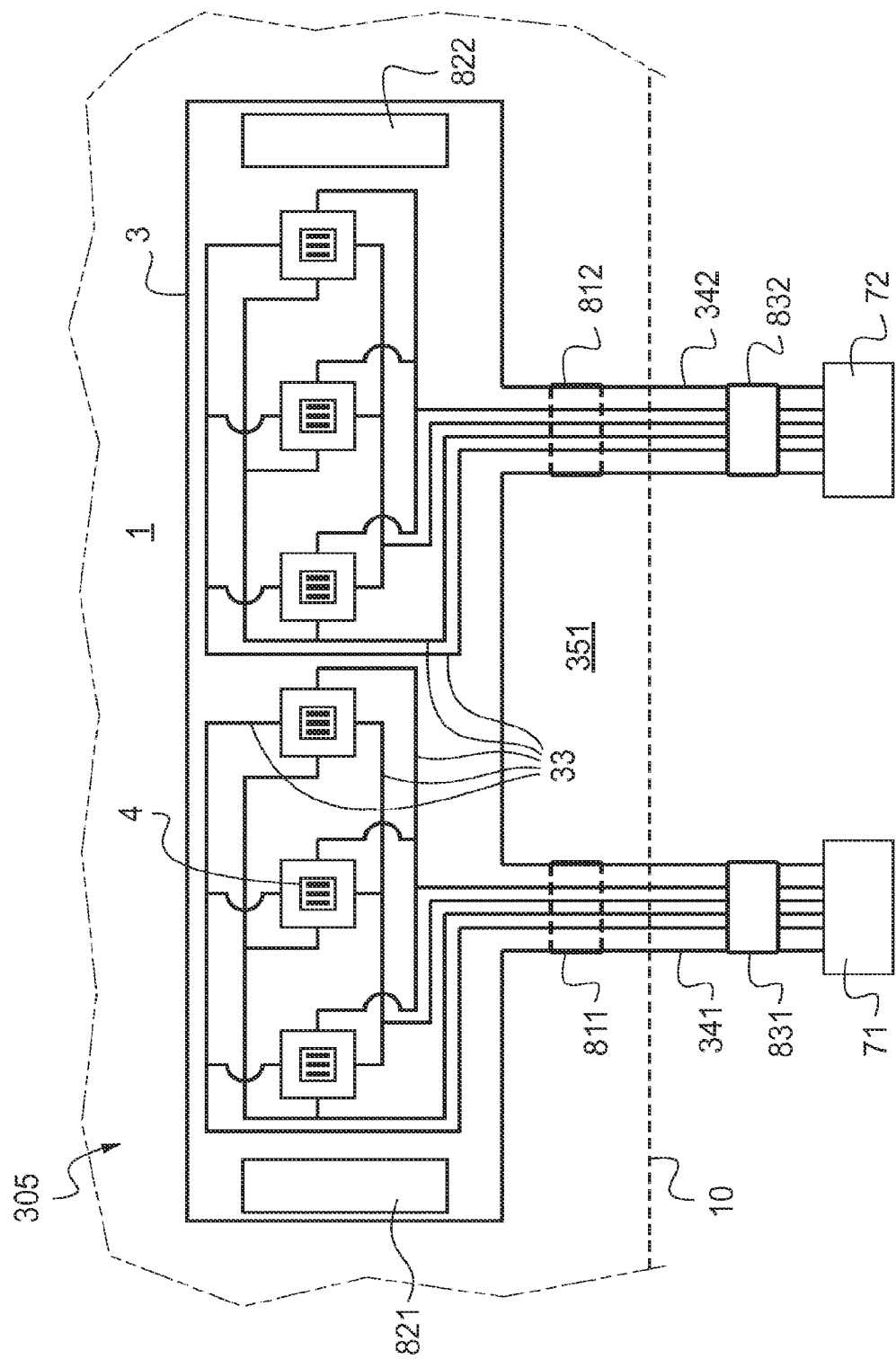

In FIG. 9, the diodes 4 are polychromatic, which involves more electrical tracks 33 (four per diode) on the carrier 305.

Figure 10:
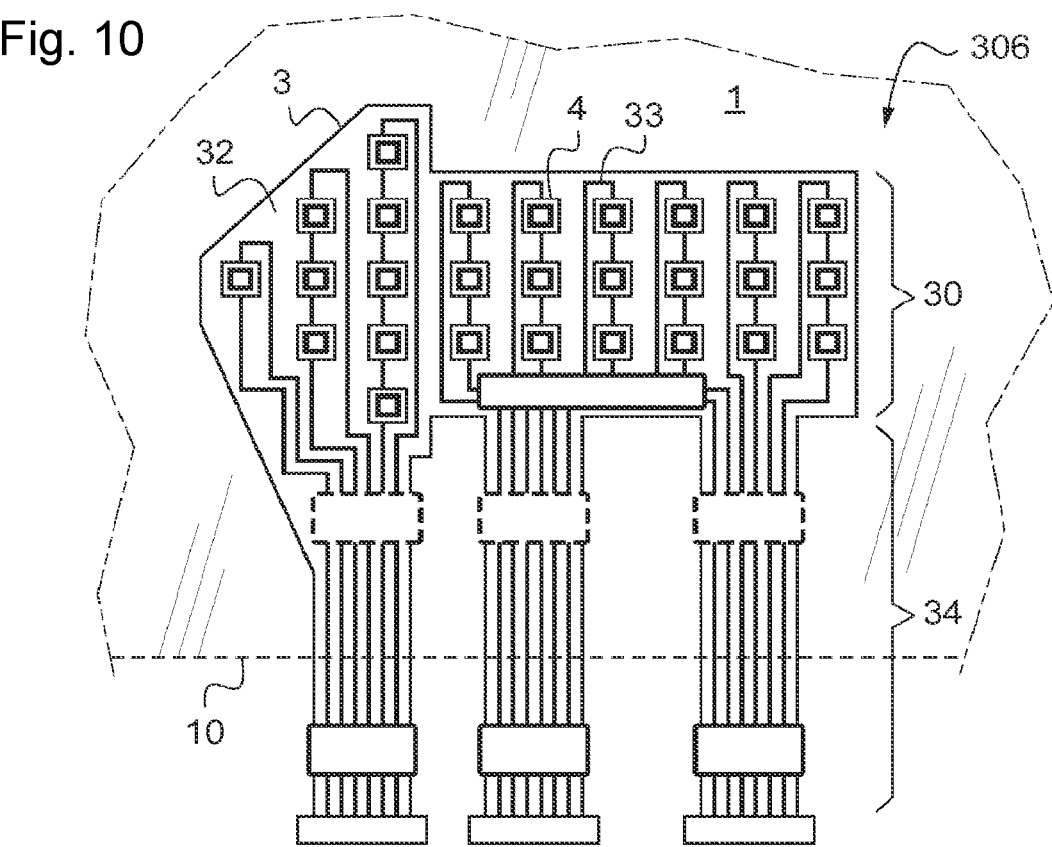
Figure 11:
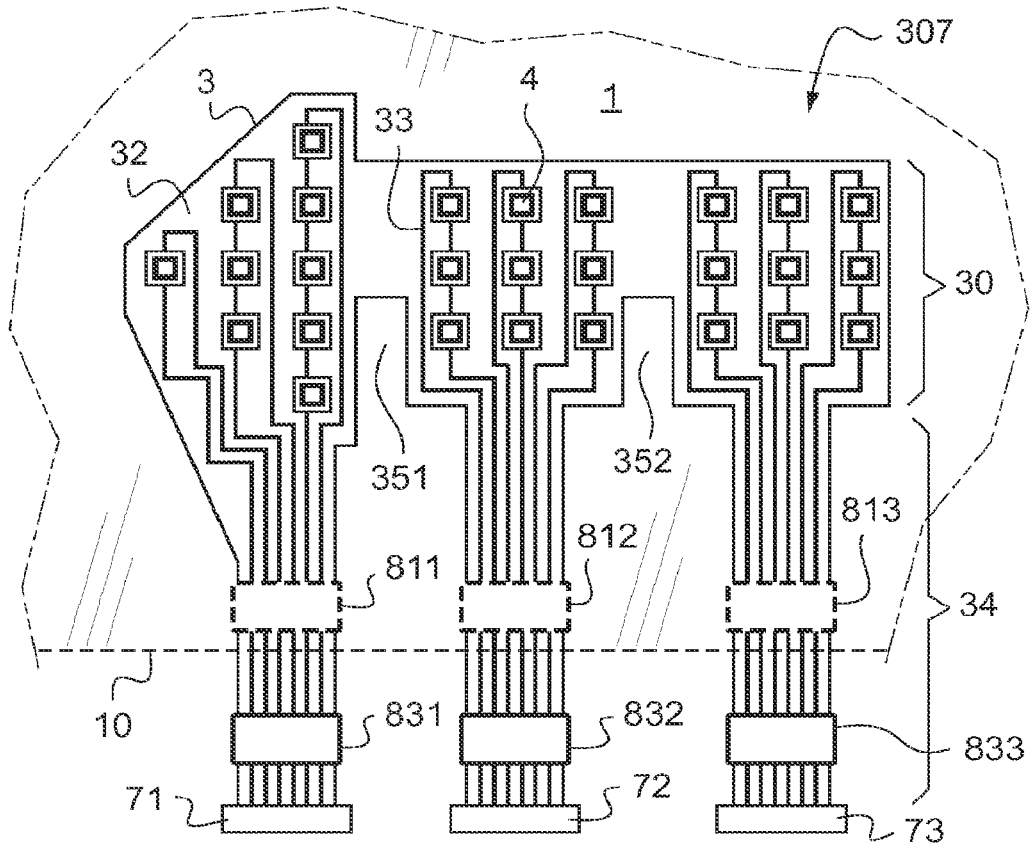

In FIGS. 10 and 11, the diodes 4 form a luminous pattern, namely an arrow, just like the diode zone 30 of the carriers 306, 307. It is possible to provide cutouts 351, 352 (straight lines, arcs, and the like) between the rows of diodes.

FIG. 12 shows a diagrammatic view, on the face F1 side, of a bent laminated sunroof 2000 mounted on a motor vehicle, which roof has two internal luminous zones in an embodiment of the invention close to the edge 60' of the enamel frame 6'.

In each zone, the diodes 4 form a luminous pattern 308, 308', namely a circle, just like the diode zone 30 of the carrier 308, 308'. The emerging zone comprises two tracks strips 341, 342 with a space 351 between them.

FIG. 13 is a diagrammatic front view (face F1 or face 11 side) of a rear window having external luminous signaling 3000 in an embodiment of the invention.

In the central zone 18, a third stop lamp 101, for example red diodes, is formed along the upper longitudinal edge and on the carrier for the diodes 309 (having three track strips 341 to 343).

In each lateral zone 17 and 19, an indicator with, for example, diodes is formed along the lateral edge involved, emitting in the yellow region, on the carrier for the diodes 310 (having three track strips 341 to 343), or else a signalling lamp with, for example, diodes is formed along the lower longitudinal edge involved on the support for the diodes 311 (having three track strips 341 to 343).

Alternatively, a turn signal indicator is formed on a side window in the same way.

FIG. 14 is an exploded diagrammatic view of a bent laminated vehicle glazing in an embodiment of the invention showing the use of a PVB 2 with through holes 23 for housing the diodes 4 on the carrier 3 on the face 12 side (rear face 31 adhesively bonded by an adhesive tape 811) before the lamination of the two glasses 1, 1'. The protruding part 341 of the carrier 3 is folded over on the face 14, adhesively bonding it by an adhesive tape 831 on the front face 32.

The invention claimed is:
1. A vehicle glazing having an internal luminous zone comprising:
 a bent laminated glazing comprising:
  a first glazing comprising a glass sheet forming an exterior glazing, with first and second main faces and a first edge face,
  a second glazing comprising a glass sheet forming an interior glazing, with third and fourth main faces and a second edge face adjacent the first edge face, and, between the second main face and the third main face, which are internal faces of the bent laminated glazing, a lamination interlayer made of thermoplastic polymeric material having a fifth main face in adhesive contact with the second main face and a sixth main face in adhesive contact with the third main face, the lamination interlayer having another edge face adjacent the first and second edge faces, inorganic light-emitting diodes arranged between the second and third main faces, each diode of the inorganic light-emitting diodes having a light-emitting face facing the third main face capable of emitting light in a direction of the third main face, a carrier for the inorganic light-emitting diodes having a front face facing the third main face and a rear face, facing the second main face, the inorganic light-emitting diodes being mounted on the front face, the carrier for the inorganic light-emitting diodes being flexible and comprising, on the front face, electrically conductive zones forming electrical tracks for supplying electricity, a portion or all of the electrical tracks arranged to supply electricity to the inorganic light-emitting diodes, and the lamination interlayer is being present between the front face and the third main face, the carrier for the inorganic light-emitting diodes being of submillimetric thickness, comprising:

diode zone arranged between the second and third main faces, said diode zone comprising said inorganic light-emitting diodes, said diode zone extending along the first edge face over a length L0 of at least 6 cm, an emerging electrical supply zone that extends in the direction of the first edge face and that emerges from the edge face of the lamination interlayer, the emerging electrical supply zone comprising a supply internal zone with the electrical tracks, between the second and third main faces, defined by a width Wt which is less than L0, and the bent laminated glazing comprises an adhesive leaktight to liquid water, positioned between the second main face and the rear face in a portion of the rear face, of submillimetric thickness, wherein the width Wt is at least 5 cm, the internal zone is divided into a plurality of track strips carrying electrical tracks, with an individual width Wi of less than 5 cm in the internal zone, the track strips emerging from edge face of the lamination interlayer, and wherein, in the internal zone, the lamination interlayer is present in an interstrip space between neighboring track strips.

2. A vehicle glazing having external luminous signaling comprising:
    a bent laminated glazing comprising:
        a first glazing comprising a glass sheet forming an exterior glazing, with first and second main faces and a first edge face,
        a second glazing comprising a glass sheet forming an interior glazing, with third and fourth main faces and a second edge face adjacent the first edge face,
    and, between the second main face and the third main face, which are internal faces of the laminated glazing, a lamination interlayer made of thermoplastic polymeric material having a fifth main face in adhesive contact with the second main face and a sixth main face in adhesive contact with the third main face, the lamination interlayer having another edge face adjacent the first and second edge faces,
        inorganic light-emitting diodes arranged between the second and third main faces, each diode of the inorganic light-emitting diodes having a light-emitting face facing the second main face capable of emitting light in a direction of the second main face,
        a carrier for the inorganic light-emitting diodes having a front face, facing the second main face and a rear face, facing the third main face, the inorganic light-emitting diodes being mounted on the front face,
    the carrier for the inorganic light-emitting diodes being flexible and comprising, on the front face, electrically conductive zones forming electrical tracks for supplying electricity, a portion or all of the electrical tracks supplying electricity to the inorganic light-emitting diodes, the lamination interlayer being present between the front face and the second main face, the carrier for the inorganic light-emitting diodes, which is of submillimetric thickness E3, comprising:
        a diode zone arranged between the second and third main faces, said diode zone comprising said inorganic light-emitting diodes, said diode zone extending along the second edge face over a length L0 of at least 6 cm,
        an emerging electrical supply zone that extends in the direction of the second edge face and that emerges from the edge face of the lamination interlayer, the emerging electrical supply zone comprising a supply internal zone with the electrical tracks, between the second and third main faces, defined by a width Wt which is less than L0,
    and the bent laminated glazing comprises an adhesive leaktight to liquid water, positioned between the rear face and the third main face in a region of the rear face, of submillimetric thickness E8,
    wherein the width Wt is at least 5 cm, the emerging electrical supply zone is divided into a plurality of track strips carrying electrical tracks, with an individual width Wi of less than 5 cm in the internal zone, the strips emerging from edge face of the lamination interlayer,
    and wherein, in the internal zone, the lamination interlayer is present in the interstrip space between neighboring track strips.

3. The vehicle glazing as claimed in claim 1, wherein the interstrip space between two neighboring track strips has a width $W_S$ of at least 5 mm.

4. The vehicle glazing as claimed in claim 1, wherein the track strips extend in the protruding zone and are connected over a width D of at least 0.5 cm.

5. The vehicle glazing as claimed in claim 1, wherein the edge face of the diode zone defines arc-shaped linking zones between neighboring track strips or linking zones that have a beveled edge or a groove.

6. The vehicle glazing as claimed in claim 1, wherein said adhesive leaktight to liquid water is a double-sided adhesive tape.

7. The vehicle glazing as claimed in claim 1, wherein the front face comprises one or more double-sided adhesive tapes that have a submillimetric thickness and that are in contact with the lamination interlayer, and that are out of contact with the inorganic light-emitting diodes.

8. The vehicle glazing as claimed in claim 1, wherein, in the protruding zone, the carrier for the inorganic light-emitting diodes is curved and extends to the fourth main face and is adhesively bonded to the fourth main face.

9. The vehicle glazing as claimed in claim 1, wherein, in the diode zone or in the internal zone, or both in the diode zone and in the internal zone, the carrier for the inorganic light-emitting diodes comprises, on the front face, electronic components of submillimetric thickness chosen from one at least of the following elements: a resistive element, a capacitive element, a transistor or a microcontroller.

10. The vehicle glazing as claimed in claim 1, wherein a distance between the emitting face of the inorganic light-emitting diodes and the third main face is at most 0.5 mm.

11. The vehicle glazing as claimed in claim 1, wherein the track strips are masked from the inside by a masking layer or from the outside by a masking layer.

12. The vehicle glazing as claimed in claim 1, wherein the diode zone is facing a gap of a masking layer, which gap is common to the inorganic light-emitting diodes or made of several individual gaps for the inorganic light-emitting diodes.

13. The vehicle glazing as claimed in claim 1, wherein the lamination interlayer is made of poly(vinyl butyral) (PVB) with a thickness E2, the inorganic light-emitting diodes have a thickness E4 which is less than E2.

14. The vehicle glazing as claimed in claim 1, wherein the lamination interlayer is made of poly(vinyl butyral) (PVB), or is made of a composite element that includes a first PVB film, a functional transparent plastic film and a second PVB film.

15. A vehicle comprising at least one vehicle glazing as claimed in claim 1, wherein, the glazing has an internal luminous zone forming a windshield, the light from the inorganic light-emitting diodes is an anticollision system.

16. The vehicle glazing as claimed in claim 2, wherein the interstrip space between two neighboring track strips has a width $W_S$ of at least 5 mm.

17. The vehicle glazing as claimed in claim 2, wherein said adhesive leaktight to liquid water is a double-sided adhesive tape.

18. The vehicle glazing as claimed in claim 2, wherein the front face comprises one or more double-sided adhesive tapes that have a submillimetric thickness and that are in contact with the lamination interlayer, and that are out of contact with the inorganic light-emitting diodes.

19. The vehicle glazing as claimed in claim 2, wherein, in the protruding zone, the carrier for the inorganic light-emitting diodes is curved and extends to the fourth main face and is adhesively bonded to the fourth main face.

20. The vehicle glazing as claimed in claim 2, wherein, in the diode zone and/or in the internal zone, or both in the diode zone and in the internal zone, the carrier for the inorganic light-emitting diodes comprises, on the front face, electronic components of submillimetric thickness chosen from one at least of the following elements: a resistive element, a capacitive element, a transistor or a microcontroller.

21. A vehicle comprising at least one vehicle glazing as claimed in claim 2, wherein, the external luminous signaling glazing forms a rear window and includes a stop lamp, a third stop lamp, or the external luminous signaling glazing forms a side window that includes a hazard warning lamp or a lamp for locating the vehicle or a turn signal indicator.

* * * * *